(12) United States Patent
Krondorfer et al.

(10) Patent No.: US 11,022,955 B2
(45) Date of Patent: Jun. 1, 2021

(54) SMART TOOL SYSTEMS

(71) Applicant: Ridge Tool Company, Elyria, OH (US)

(72) Inventors: Harald Krondorfer, Aurora, OH (US);
Naga Penmetsa, Westlake, OH (US);
Rudolf Kreuzer, Buchs (CH)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 16/871,444

(22) Filed: May 11, 2020

(65) Prior Publication Data

US 2020/0272124 A1 Aug. 27, 2020

Related U.S. Application Data

(60) Continuation-in-part of application No. 16/552,060, filed on Aug. 27, 2019, which is a division of application No. 14/665,088, filed on Mar. 23, 2015, now Pat. No. 10,437,228.

(60) Provisional application No. 61/973,932, filed on Apr. 2, 2014.

(51) Int. Cl.
*G05B 19/4063* (2006.01)
*B25F 5/00* (2006.01)
*G07C 9/38* (2020.01)
*G07C 3/08* (2006.01)

(52) U.S. Cl.
CPC ............ *G05B 19/4063* (2013.01); *B25F 5/00* (2013.01); *G07C 3/08* (2013.01); *G07C 9/38* (2020.01); *G05B 2219/50206* (2013.01)

(58) Field of Classification Search
CPC ............... B25F 5/00; G05B 19/4063; G05B 2219/50206; G07C 3/08; G07C 9/00166
See application file for complete search history.

(56) References Cited

U.S. PATENT DOCUMENTS

| | | |
|---|---|---|
| 6,005,489 A | 12/1999 | Siegle et al. |
| 6,872,121 B2 | 3/2005 | Wiesner et al. |
| 7,119,686 B2 | 10/2006 | Bertness et al. |
| 7,298,240 B2 | 11/2007 | Lamar |
| 7,339,477 B2 | 3/2008 | Puzio et al. |
| 7,394,347 B2 | 7/2008 | Kady |
| 7,608,790 B2 | 10/2009 | Patton |
| 8,169,298 B2 | 5/2012 | Wiesner et al. |
| 8,461,960 B2 * | 6/2013 | Nakano .............. H04N 21/4117 340/4.11 |
| 8,542,090 B2 | 9/2013 | Calvet et al. |

(Continued)

FOREIGN PATENT DOCUMENTS

AU 2012258380 6/2013
AU 2012258380 A1 6/2013
(Continued)

OTHER PUBLICATIONS

Instruction Manual; www.dewalt.com; 14 pages.

(Continued)

*Primary Examiner* — Omeed Alizada
(74) *Attorney, Agent, or Firm* — Mark E. Bandy; Rankin, Hill & Clark LLP

(57) ABSTRACT

Systems and methods are described for governing and monitoring operations of tools. The systems include a registration-and-control computer, one or more mobile devices, and one or more tools. The tools include electronic locking provisions which upon activation selectively enable tool operation.

25 Claims, 17 Drawing Sheets

(56) References Cited

U.S. PATENT DOCUMENTS

| | | | |
|---|---|---|---|
| 9,055,033 B2 | 6/2015 | Mergener | |
| 9,070,279 B2 | 6/2015 | Shimizu et al. | |
| 2005/0248893 A1* | 11/2005 | Anderson | B25F 5/00 361/78 |
| 2006/0071753 A1 | 4/2006 | Lamar | |
| 2006/0155582 A1* | 7/2006 | Brown | G16H 10/20 705/3 |
| 2009/0015372 A1 | 1/2009 | Kady | |
| 2009/0138116 A1 | 5/2009 | Austin et al. | |
| 2009/0251330 A1 | 10/2009 | Gerold et al. | |
| 2013/0109375 A1 | 5/2013 | Zeiler et al. | |
| 2013/0328661 A1 | 12/2013 | Phillips et al. | |
| 2014/0006295 A1 | 1/2014 | Zeiler et al. | |
| 2014/0070924 A1 | 3/2014 | Wenger et al. | |
| 2014/0107853 A1 | 4/2014 | Ashinghurst et al. | |
| 2014/0151079 A1 | 6/2014 | Furui et al. | |
| 2014/0158389 A1 | 6/2014 | Ito et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2014/0180464 A1 | 6/2014 | Koerber | |
| 2014/0240125 A1 | 8/2014 | Burch et al. | |
| 2014/0367134 A1 | 12/2014 | Phillips et al. | |
| 2014/0379136 A1 | 12/2014 | Schlegel et al. | |
| 2015/0244807 A1 | 8/2015 | Shoemake et al. | |

FOREIGN PATENT DOCUMENTS

| | | |
|---|---|---|
| CN | 1641174 A | 7/2005 |
| CN | 101023450 | 8/2007 |
| CN | 101419727 A | 4/2009 |
| CN | 102609665 A | 7/2012 |
| CN | 103886247 | 6/2014 |
| DE | 20317913 U1 | 2/2004 |
| DE | 10309703 A1 | 9/2004 |
| DE | 102012112835 A1 | 6/2014 |
| EP | 1273723 | 1/2003 |
| EP | 1455319 A2 | 9/2004 |
| EP | 2680093 | 1/2014 |
| GB | 2418252 | 3/2006 |
| WO | WO0171642 A2 | 9/2001 |
| WO | 2006003455 | 1/2006 |
| WO | WO 2011077001 | 6/2011 |
| WO | 2013014890 | 1/2013 |
| WO | 2014005097 | 1/2014 |
| WO | 2015061370 | 4/2015 |

OTHER PUBLICATIONS

Dewalt Tool Connect™ mobile app; http://toolconnect.dewalt.com; 5 pages.
http://news.thomasnet.com/fullstory/theft-protection-system-eliminates-missing-tools-469258 (4 pages).
Hilti TPS Company Card (9 pages).
International Search Report (ISR) and Written Opinion; PCT/US2015/23243 ; dated Jul. 8, 2015 (11 pages).
Extended European Search Report dated Oct. 6, 2017; Application No. 15772767.8; 9 pages.
China: Office Action dated Jun. 1, 2017; Application No. 201580008488.5; 31 pages.

* cited by examiner

SMART TOOL SYSTEMS

CROSS REFERENCES TO RELATED APPLICATIONS

This application is a continuation-in-part (CIP) application and claims priority upon U.S. nonprovisional application Ser. No. 16/552,060 filed Aug. 27, 2019, which is a divisional application from U.S. nonprovisional application Ser. No. 14/665,088 filed Mar. 23, 2015, now U.S. Pat. No. 10,437,228, which claims priority upon U.S. provisional application Ser. No. 61/973,932 filed Apr. 2, 2014.

FIELD

The present subject matter relates to tools and particularly power tools, systems utilizing such tools, and methods for governing and monitoring tool use.

BACKGROUND

Remote activation systems are known in the art and have been used in electronic devices such as digital cameras, laptop computers, and other electronic instruments. Although satisfactory in many respects, these systems often require lengthy or intricate set-up or initialization procedures for the purchaser or owner of the device. In addition, depending upon the features of the remote activation system, such systems may also be expensive and significantly increase the cost of the device into which they are incorporated.

Remote activation and tracking systems have also been applied to tools for example in order to track location of a tool within a facility or to monitor use of the tool. However, many remotely-located jobsites cannot use state-of-the-art remote activation and tracking systems to control and/or monitor tool operation for various reasons, some of which are discussed in U.S. Pat. No. 10,437,228 hereby incorporated in its entirety.

Electronic theft protection systems for tools are known such as provided by Hilti Inc. The Hilti TPS system consists of a company card, activation key, and an electronic module inside the tool. A unique theft protection code is set initially in each tool using the company card. Authorized users unlock the tool by holding the activation key to the tool to unlock the tool. If the tool is stolen, it will lock after 20 minutes and can not be restarted without the activation key. Although satisfactory in certain aspects, implementation and use of the system at a jobsite and/or with multiple tools becomes cumbersome because separate cards are required for each tool. Furthermore, if the activation key is lost or stolen, the tool is unusable.

In view of these and other concerns, a need remains for systems and related methods whereby tools can be remotely accessed and provided with parameter-limit data and which do not require the use of a subsequent wireless signal, with minimal or no involvement from the tool user, and which systems are inexpensive and relatively easy to implement and maintain.

SUMMARY

The difficulties and drawbacks associated with previously known systems are addressed in the present tools, systems, and methods according to the present subject matter.

In one aspect, the present subject matter provides a system comprising a registration-and-control component, at least one mobile device remote from the registration-and-control component, and a tool having data storage provisions, communication provisions, and electronic lock provisions. The system also comprises a wireless communication link between the tool and the mobile device. And, the system additionally comprises a cellular communication link between the mobile device and the registration-and-control component.

In another aspect, the present subject matter provides a system comprising a registration-and-control component, at least one mobile device remote from the registration-and-control component, and a tool having data storage provisions, communication provisions, and electronic lock provisions. The system also comprises a first cellular communication link between the tool and the registration-and-control component. And, the system further comprises a second cellular communication link between the mobile device and the registration-and-control component.

In yet another aspect, the present subject matter provides a method for governing operation of a tool. The method comprises providing a system including (i) a registration-and-control component; (ii) at least one mobile device, and (iii) at least one tool including communication provisions and electronic locking provisions. The method also comprises setting a parameter to govern tool operation using the mobile device. The method additionally comprises the mobile device sending the parameter to the registration-and-control component and upon receipt by the registration-and-control component, the mobile device receiving authorization from the registration-and-control component. The method also comprises the mobile device sending instructions to the tool and upon receipt by the tool, the mobile device receiving confirmation from the tool. The method further comprises the mobile device sending confirmation to the registration-and-control component. And, the method also comprises the registration-and-control component updating a master registry.

In still another aspect, the present subject matter provides a method for governing operation of a tool. The method comprises providing a system including (i) a registration-and-control component; (ii) at least one mobile device, and (iii) at least one tool including communication provisions and electronic locking provisions. The method also comprises setting a parameter to govern tool operation using the mobile device. The method additionally comprises the mobile device sending the parameter to the registration-and-control component. The method further comprises the registration-and-control component verifying authorization and saving the parameter. The method also comprises the registration-and-control component sending instructions to the tool and upon receipt by the tool, receiving confirmation by the tool. And, the method additionally comprises the registration-and-control component updating a master registry.

In yet another aspect, the present subject matter provides a system comprising a registration-and-control component. The system also comprises at least one mobile device remote from the registration-and-control component. The system also comprises a tool having data storage provisions, communication provisions, and electronic lock provisions. The electronic lock provisions are configured to prohibit tool use based upon at least one parameter selected from the group consisting of (i) tool operational time period, (ii) number of cycles or intervals of tool operation, (iii) end date or time, (iv) operating range(s) of tool, and (v) combinations of (i)-(iv).

In still another aspect, the present subject matter provides a smart tool system comprising a registration-and-control component. The system also comprises at least one mobile device functionally and operatively configured to communicate electronically with the registration-and-control component. The system additionally comprises at least one smart tool configured to have smart-tool provisions selected from the group consisting of: electronic tool-lock provisions, wireless and/or cellular communication provisions, data-storage provisions, and combinations thereof. A first cellular communication link is functionally and operatively configured for enabling data transmission between the at least one mobile device and the registration-and-control component. A second cellular communication link is functionally and operatively configured for enabling data transmission between the registration-and-control component and the at least one smart tool. The tool-lock provisions are functionally and operatively configured to prevent smart tool use and/or functionality based upon at least one parameter limit.

In yet another aspect, the present subject matter also provides a smart tool system comprising a registration-and-control component. The system also comprises at least one mobile device functionally and operatively configured to communicate electronically with the registration-and-control component. The system further comprises at least one smart tool configured to have smart tool provisions selected from the group consisting of: electronic tool-lock provisions, wireless and/or cellular communication provisions, data-storage provisions, and combinations thereof. A wireless communication link is functionally and operatively configured for enabling data transmission between the at least one mobile device and the at least one smart tool. A cellular communication link is functionally and operatively configured for enabling data transmission between the at least one mobile device and the registration-and-control component. The tool-lock provisions are functionally and operatively configured to prevent smart tool use and/or functionality based upon at least one parameter limit.

In a further aspect, the present subject matter provides a method for setting up and operating a smart-tool system. The method comprises providing a smart-tool system comprising at least one smart tool operatively configured to have smart-tool provisions selected from the group consisting of: tool-lock provisions, wireless and/or cellular data transmission and/or electronic communication provisions, data-storage provisions, and combinations thereof. The system also comprises at least one mobile device functionally and operatively configured to communicate with a registration-and-control component. The tool-lock provisions are functionally and operatively configured to prevent smart-tool functionality based upon at least one parameter limit. The method also comprises providing data transfer and cellular communication information effective for enabling a user to establish a first cellular communication link effective for sending and/or receiving data including the at least one parameter limit between the at least one mobile device and the registration-and-control component. The method also comprises providing data transfer and cellular communication information effective for enabling a user to establish a second cellular communication link effective for sending and/or receiving data including the at least one parameter limit between the at least one smart tool and the registration-and-control component.

In yet another aspect, the present subject matter provides a method for setting up and operating a smart-tool system. The method comprises providing a smart-tool system comprising at least one smart tool operatively configured to have smart-tool provisions selected from the group consisting of: tool-lock provisions, wireless and/or cellular data transmission and/or electronic communication provisions, data-storage provisions, and combinations thereof. The system also comprises at least one mobile device functionally and operatively configured to communicate with a registration-and-control component. The tool-lock provisions are functionally and operatively configured to prevent smart-tool functionality based upon at least one parameter limit. The method additionally comprises providing data transfer and wireless communication information effective for enabling a user to establish a wireless communication link effective for sending and/or receiving data including the at least one parameter limit between the at least one smart tool and the at least one smart tool. The method further comprises providing data transfer and cellular communication information effective for enabling a user to establish a cellular communication link effective for sending and/or receiving data including the at least one parameter limit between the at least one mobile device and the registration-and-control component.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
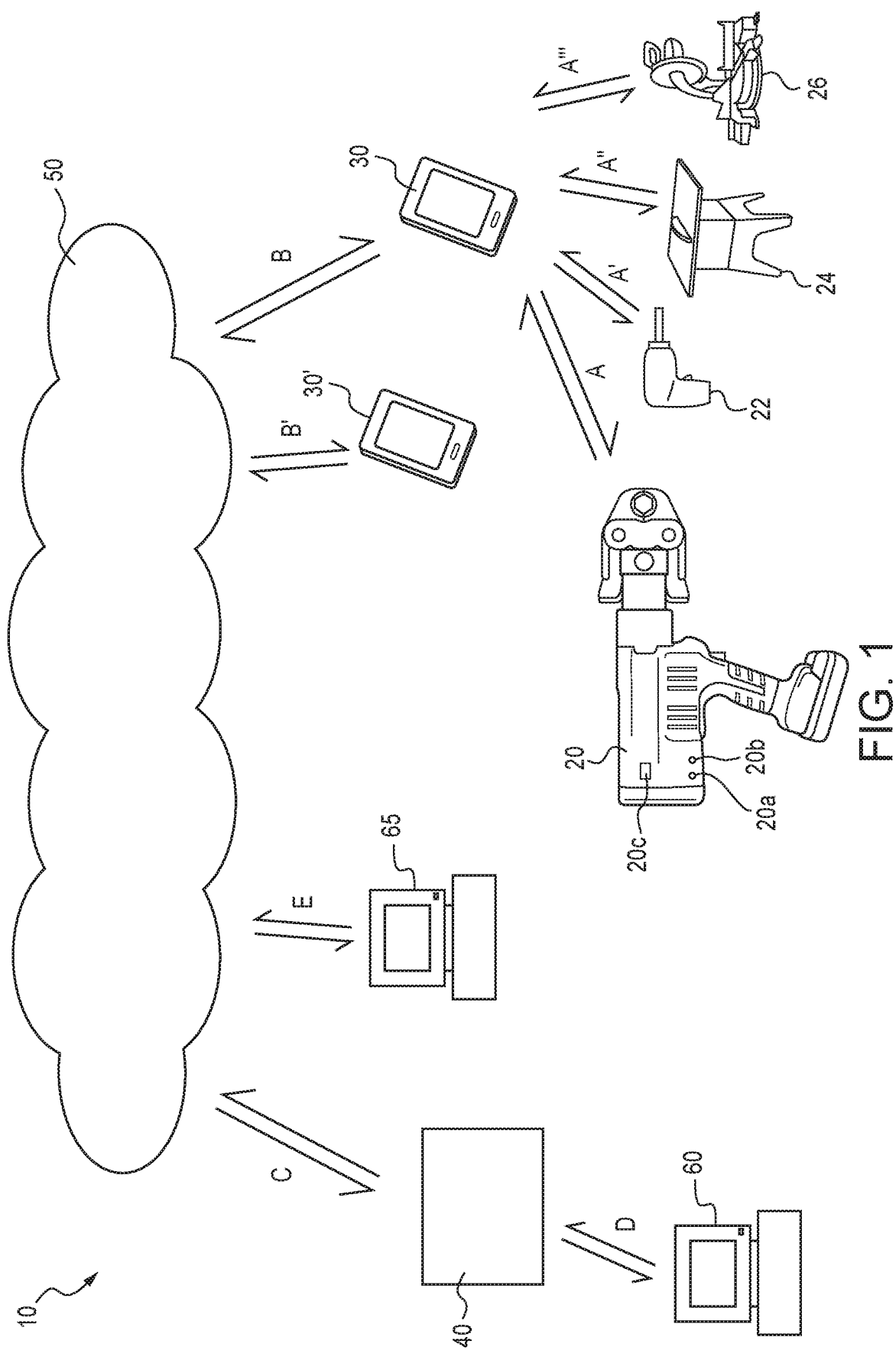
FIG. 1 is a schematic illustration of a system for governing and/or monitoring tool use in accordance with the present subject matter.

The present subject matter provides systems and methods which govern use of one or more tools by utilizing an activation or actuation signal or transmission which enables subsequent tool operation. After receipt of the initial signal by the tool, the tool does not require any further communication, and particularly does not require the presence of a continuous signal for subsequent operation.

The systems of the present subject matter generally comprise (i) a registration-and-control component, typically provided by one or more computer servers or information processing units for issuing activation signal(s), (ii) one or more mobile electronic devices for communicating with one or more tools of interest and relaying activation signal(s) to the tools, and (iii) at least one tool including electronic data storage provisions, communication provisions, and electronic locking provisions, all of which are described in greater detail herein.

In one aspect, the present subject matter provides a system for governing operation of a tool. The system comprises a cloud-based server with sufficient memory to store smart tool access data for a plurality of smart tools. The system also includes a user interface to provide user-access to the cloud-based server. The cloud-based server includes a processor able to match the smart tool access data of each smart tool to a user authorized to use at least one of the plural smart tools. The smart tool system also includes a cloud-based registration-and-control component. The smart tool system of the present subject matter also includes at least one so-called "smart tool," preferably a plurality such, having electronic communication provisions (e.g., wireless or cellular), sufficient memory for storing smart-tool operational parameters and parameter limits by which each such smart tool will lock or disable itself automatically after a parameter limit is met. Such parameter limits are maintained, accounted for, and occasionally executed by a clock- or comparator-based system that is operatively configured, e.g., to keep track of time-of-operation of each of the plurality of smart tools, as well as for comparing a current smart-tool operational cycle to a specified smart-tool operational-cycle limit.

Generally, the smart tool(s) are initially provided with their electronic locking provisions deactivated. Thus, the smart tools can be used in a conventional fashion. If the tools are registered with a smart tool operating system configured to govern smart tool operation, a tool owner or party with supervisory status will be prompted to select an operating mode (or use) for the smart tool. One operating mode enables the smart tool to be used without supervision or control from the smart tool use-governing system. This mode is referred to herein as a "free mode" or "indefinite duration mode". If that mode is selected for the tool, the electronic locking provisions will remain deactivated. Another operating mode referred to herein as a "supervised mode," enables the tool to be used, for example, for: (i) a preset period of time (or until a specified time or date), or (ii) for a preset number of activation cycles, or (iii) until the first occurrence of either (i) or (ii). In supervised mode, a tool owner/supervisor specifies one or both of (i) a maximum amount of cumulative time during which the tool is operational, and/or (ii) a maximum cumulative number of activation cycles during which the smart tool is operational. In other words, smart tool operation could be based either upon a predetermined number (e.g., 10; 50; 100; 300; 500; 1,000; 5,000; 10,000; and so forth) of operational cycles or a predetermined number of tool actuations (e.g., "trigger pulls"). The smart tool owner or supervisor could, in accordance with the present subject matter, also specify a time at which and/or a date on which smart tool activation expires. All such selections are preferably stored in the data storage provisions of an associated smart tool. In certain embodiments, the smart tool system can transmit an activation signal which is relayed to a designated smart tool by the mobile device thereby for either de-activating the electronic locking provisions or activating the unlocking provisions, for enabling smart tool operation. After receipt by the designated smart tool of an authorized activation signal, subsequent communication with the smart tool (and the system) is not required until the enabling parameter expires, as a result of a parameter limit occurring. In this way, a smart tool can be used at remote locations wherever wireless signals are not present. Moreover, in particular embodiments of the present subject matter, functional operation of a disabled smart tool can be revived upon re-setting of a timer and/or a counter. Additional supervised operating modes are disclosed and discussed below.

If a selected smart tool operational parameter limit is time of tool operation, during all instances of smart tool operation, its operating time is cumulatively measured, recorded, and can later be used to prepare various reports, including for example hours used, frequency used (per day, week, month). Cumulative operational time for a smart tool is also continuously compared to an amount of cumulative time previously specified and stored in the tool. Once the monitored cumulative time of tool operation is greater than the specified limit for amount of cumulative time, the electronic locking provisions of the smart tool, cause smart tool operation to be disabled. Disabling tool operation does not require communication between the tool and the system or mobile device.

If the selected parameter limit is, for instance, the number of activation cycles of a smart tool, all instances of smart tool activation, including operational parameters, are cumulatively measured, recorded, and saved for analytical purposes, including preparing operational-activity reports. The measured cumulative number of activation cycles is continuously compared to a maximum cumulative number of activation cycles previously specified and stored in the tool. Once the monitored cumulative number of activation cycles is greater than a prior-specified maximum number of activation cycles, the electronic locking provisions cause a smart tool to automatically become disabled.

For instance, if a limiting parameter is a specified time of day, or a specified date, an internal real time clock component of electronic tool-lock provisions of a smart tool compares actual time with an expiration date; and the tool is disabled on that date.

It is understood that the present subject matter contemplates using various parameter limits to govern tool use. Such parameter limits include the amount of time that a smart tool is permitted to be operational, a predetermined number of activation cycles for a smart tool to be operational, a specified time of day including specified days in a week, when a smart tool is to be operational, a preselected number of operational cycles (e.g., such "trigger pulls" as "start," "stop," "on," "off") during which a smart tool is to be operational, as well as a specified distance from a specified location, and so forth.

Certain embodiments of the smart tool(s) of the present subject matter do not require continuous, direct communication with the registration-and-control component. Instead, as previously described, in such embodiments, the registration-and-control component issues a one-time activation signal to a mobile device which relays the signal to a tool of interest. In such embodiments, the tool is enabled by re-setting timers or counters in the smart tool, and thus no activation signal to such tools is required.

Registration-and-Control Component

The registration-and-control component receives information and data, retains information and data, administers access and use permissions, and governs user access to, and use of, tools registered with the system. The registration-and-control component in many embodiments of the present subject matter is provided by one or more computer servers or units which may be remotely located. As described herein, typically the one or more registration-and-control component(s) is accessed via the internet and can include cloud-based storage, processing, and/or communication. Cloud storage is a model of computer data storage, in which digital data is physically stored on multiple servers (sometimes in multiple locations), wherein the physical environment is typically owned and managed by a cloud storage provider, responsible for keeping the data available and accessible, and the physical environment protected and running.

The registration-and-control component of the present subject matter includes a database and data storage provisions in which user information is stored and securely retained. Non-limiting examples of retained information include authorized user name; registrant name if different from authorized user name; company or organization name; contact information of user, registrant, and/or company; date of initial registration of user and/or tool(s) and optionally dates of subsequent registrations or logins; password(s) and other confidential information relating to a user, a registrant, and/or a company; designation or status of user, registrant, and/or company, e.g, industrial, contractor, builder, or home user; location of registered user and/or tool; preset or predesignated smart tool parameters to be monitored and their associated parameter limits; actual use-based smart tool parameters that are monitored; warnings or indicators associated with registered tools or users; status of warnings or indicators; and other information and data including IP addresses used to register smart tools or to enable each tool.

In select embodiments, the registration-and-control component may include electronic communication systems or provisions (wireless and/or cellular) for enabling the registration-and-control component to exchange, transmit, or receive information (such as above-mentioned data gathered during smart tool operation) from the one or more mobile electronic devices. In many embodiments of the present subject matter, the registration-and-control component includes internet communication provisions.

In many versions of the present subject matter, the smart tool systems and particularly the registration-and-control component use cloud-based storage systems and/or cloud-based data-processing and storage systems that can be accessed and implemented in a distributed fashion using remotely located servers or other computers. Typically such servers, computers and/or other devices are accessed via the internet.

In connection with the present subject matter, cloud-based storage and/or cloud-based processing refers to online storage and/or processing by which data is stored (either virtually or actually) and/or processed across one or multiple servers, typically hosted by commercial internet service providers. In embodiments, the term "cloud-based computing" refers to one or more cloud-based data storage, cloud-based data processing, or cloud-based data communication components. Also, commercial internet service providers may include data centers, able to virtualize certain resources based on customer requirements. The data storage services of such providers may be accessed via web service application programming interfaces ("API") or via web-based user interfaces ("UI"). Cloud-based computing is described in the prior art including, e.g., WO 2013/141868; US 2012/0060165; WO 2013/119247; and US 2011/0153868.

Mobile Electronic Device(s)

The smart tool systems of the present subject matter also include at least one electronic-based mobile device. Non-limiting examples of such mobile devices include personal data assistants ("PDAs"), smartphones, tablet computers, laptop computers, and so forth. More particularly, a preferred mobile device for the present subject matter includes a computing device having a small-form factor portable electronic device such as a mobile phone or smartphone, or, alternatively, a personal data assistant ("PDA"), a personal media-player device, an application-specific device, such as a tablet computer or a slate computing device, or a hybrid device that may include any of the above-noted functions. Nonlimiting examples of smartphones include devices running on ANDROID or IPHONE, e.g., iOS, platforms. Non-limiting examples of tablet computing devices include IPAD available from Apple Corporation. Nonlimiting examples of a personal media player device is an IPOD or more particularly an IPOD TOUCH available from Apple. The mobile device may also be in the form of a personal computer including both laptop computer and/or non-laptop, e.g., desktop, computer configurations.

The electronic mobile devices of the present subject matter include electronic data storage provisions, control provisions, communication provisions, user interface provision, and more. Data storage provisions of the mobile devices enable information relating to smart tool use, user information, data, and permissions to access data from the registration-and-control component to be stored on the system and accessed at the mobile device. The data storage provisions can be in the form of known data storage formats including flash-memory components. Such data storage provisions may also include or be in the form of memory cards, disk or drive components, data cartridges or components such as ROM or RAM memory, and peripheral data-storage components.

Control provisions of the mobile devices typically include electronic circuitry, generally in the form of one or more processors. In embodiments, mobile devices may control data and/or information exchange or transmission with one or more smart tools registered with the system. As mentioned above, the electronic mobile devices relay activation signal(s) issued from the registration-and-control component to the tool(s).

The mobile devices of the present subject matter also include communication provisions operatively effective between the mobile device and one or more smart tools; and also operatively effective between the mobile device and a registration-and-control component of a smart tool system. Communication between the mobile device and the smart tool(s) can be established or provided using one or more communication formats such as radio frequency ("RF"), infrared ("IR"), and/or BLUETOOTH as known in the art. Specifically, the term "BLUETOOTH" relates to a wireless technology standard that is used for exchanging data between fixed and mobile devices over short distances using short-wavelength UHF radio waves via, for example, industrial, scientific and medical radio bands, of from about 2.402 to 2.480 GHz, and Personal Area Networks ("PANs") established in certain buildings, both public and private, as well as certain other areas. In particular embodiments, wireless communication is via wireless local area network ("WLAN"), also known as, Wi-Fi. The present subject matter includes using other types of communication, e.g., near-field communications ("NFC"). And for such purposes, a nonlimiting list of suitable wireless protocols, enabling wireless communication between at least one electronic mobile device and at least one smart tool(s), both of which are configured for exchanging data via wireless communication links, include ZIGBEE, GLOWPAN, Wireless HART, ISA 100, WiMi, SimpliciTI, KNX, EnOcean, Dash7, WISA, ANT, ANT+, WiMax, ONE-NET, Z-Wave, Insteon, and RuBee. A particularly preferred form of electronic communication, cellular communication, is discussed below. Also, as an alternative to wireless and/or cellular communication, electronic signal transmission including transmission of data or other information, between at least one mobile device and a smart tool, can also be established by cables or other hardwired connections.

Mobile devices may be communicatively coupled to cloud-based service and data centers and/or a third party entity via, e.g., at least a wireless local area network technology (WLAN), i.e., Wi-Fi. However, embodiments of local access to cloud-based storage are not limited to wireless communications, and therefore hard-wired communications may also apply to the embodiments described herein.

The various electronic mobile devices of the present subject matter thus are configured to include electronic communication provisions between the at least one mobile device and the registration-and-control component. Typically, such electronic communications are transmitted and exchanged via the internet, and often utilize a cloud-based infrastructure. However, the present subject matter includes using other communications between a mobile device and the registration-and-control component.

The electronic mobile devices may also include one or more user-interface provisions. For instance, a mobile device could be in the form of a portable electronic computer, for example an "IPAD." Or, another suitable electronic mobile device could include a keyboard, provided either virtually or as a physical input device incorporated into the body of a mobile device or separable from but connectable to the mobile device. Still other input components could be used such as mouses, track balls, and joysticks for example. Also, an electronic mobile device of the present subject matter typically includes a display or other information output, enabling such information to displayed for or viewed by a user. While such display is typically incorporated into the mobile device, the present subject matter contemplates using separate but connectable displays.

As previously noted, the mobile devices also include electronic data storage provisions and smart tool use control provisions. In select embodiments of the present subject matter, the mobile device is configured to run or execute an algorithm or "app" as known in the art which facilitates communication with the registration-and-control component and/or the smart tool. Apps, their transfer or download, and the "running" and maintenance of such "apps" are described in the prior art including U.S. Pat. No. 8,549,656; US 2013/0122861; WO 2013/163249; and WO 2012/155937. In relation to the present subject matter, the algorithm or app selected for a smart tool system may also facilitate administration of permissions from the registration-and-control component, transmission of data or information between the registration-and-control component and the mobile device, and/or between the registration-and-control component and an electronic mobile device and at least one of the smart tools of the present subject matter. The algorithm or app may also facilitate user access, use of one or more smart tools of interest, and/or provide indications and/or warnings to a user concerning the tools and/or the system.

FIG. 1 schematically illustrates an embodiment of a system 10 in accordance with the present subject matter. The system 10 comprises one or more tools 20, one or more mobile devices 30, and a registration-and-control component 40. In many embodiments of the present subject matter, the system 10 also comprises a cloud-based infrastructure 50 for providing communication between the registration-and-control component 40 and the one or more mobile devices 30.

The system 10 comprises one or more communication links between the tool(s) 20 and the mobile device(s) 30 collectively shown in FIG. 1 as link(s) A. More particularly, other nonlimiting examples of tools include a drill 22 which can communicate with the mobile device 30 via link(s) A', a table saw 24 which can communicate with the mobile device 30 via link(s) A", and a miter saw 26 which can communicate with the mobile device 30 via link(s) A'''. Additional nonlimiting examples of tools include measurement devices such as thermal cameras or inspection devices such as drain inspection cameras. The system 10 also comprises one or more communication links between the mobile device(s) 30 and the cloud-based infrastructure 50 collectively shown in FIG. 1 as link(s) B. The system can also comprise additional mobile device(s) collectively depicted as 30' which can communicate with the cloud 50 via link(s) B'. The system 10 also comprises one or more communication links between the registration-and-control component 40 and the cloud-based infrastructure 50 collectively shown in FIG. 1 as link(s) C. It is contemplated that communication link(s) could also be provided directly between the registration-and-control component 40 and the mobile device(s) 30. In addition, the system 10 can comprise one or more personal computers (PCs) or laptop computers 60 which can communicate via link(s) D with the registration-and-control component 40. And, the system 10 can also comprise one or more personal computers (PCs) or laptop computers 65 which can communicate with the cloud 50 via link(s) E. The present subject matter also includes variations of these systems. For example, computers 60 and/or 65 can also be configured to communicate with the tool(s). Thus the computers 60, 65 serve a role of the mobile device 30.

In certain embodiments, the mobile device can be configured as a "trusted" device. In this aspect, the mobile device can receive, store, and/or issue one or more actuation code(s) that can be used repeatedly. In this aspect, it is also contemplated that repeated issuance of an actuation code may not require communication between the trusted mobile device and the registration-and-control component.

Tool(s)

The present subject matter system includes one or more smart tools having electronic data storage provisions, electronic control circuitry, and communication provisions. As noted, the tools may be in the form of various devices such as cameras, or measurement or inspection devices. In many embodiments, the tools also comprise electronic lock or locking provisions. Typically, the tools are electrically powered or at least include electrical controls. In many embodiments, the tools are hand-held tools however the present subject matter includes other tools or tool systems such as stationary or non-mobile tool systems such as floor standing equipment or transportable or bench top tools. One or multiple tools can be utilized with the registration-and-control component and the mobile devices. Nonlimiting examples of tools include press tools, crimping tools, inspection or remote viewing systems, locating equipment, rotary powered tools including drills, grinders, impact tools, powered wrenches, expansion tools, shaping or forming tools, table saws, circular saws, miter saws, and the like. A wide array of tools are encompassed by the present subject matter.

Electronic data-storage provisions, typically incorporated into a smart tool, can be in the form of known data storage formats including flash-memory components. The data-storage provisions may also include or be in the form of memory cards, disk or drive components, data cartridges or components such as ROM or RAM memory, and peripheral data storage components. The electronic control circuitry includes one or more electronic processors configured to implement and execute the systems and methods described herein. The communication provisions are typically selected in view of the communication provisions of the mobile device(s). Various communication formats can be used for the tool including but not limited to radio frequency, infrared, BLUETOOTH, Wi-Fi, near-field communications, and cable-based communications. The previously noted communication protocols can be used for tool communication.

Figure 2:
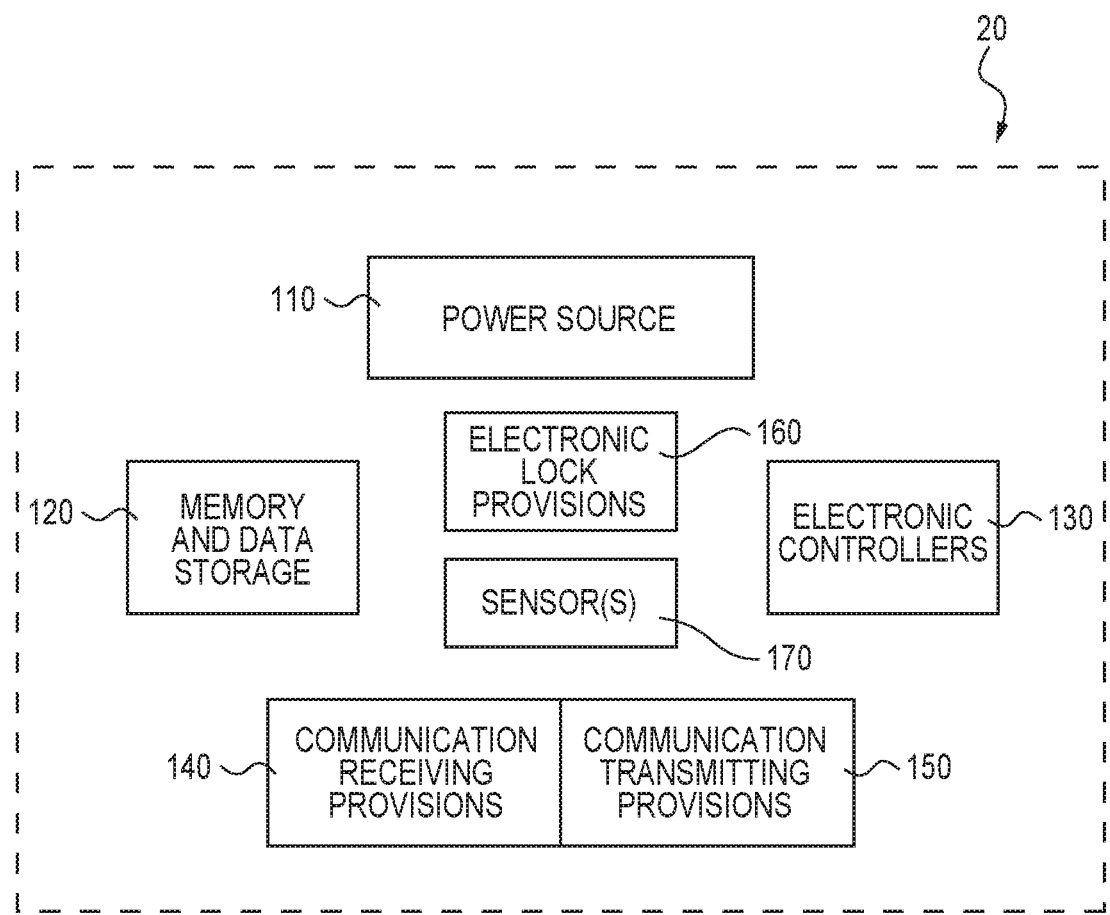
FIG. 2 is a schematic illustration of components incorporated in a tool in accordance with the present subject matter.

FIG. 2 is a schematic illustration of components incorporated in a tool 20 of the present subject matter. The tool 20 generally comprises a power source 110 which typically includes one or more batteries and/or a source of external electrical power, memory and data storage provisions 120, one or more electronic controllers 130, communication receiving provisions 140, and communication transmitting provisions 150. The electronic controllers 130 typically include microprocessor based circuits that can be configured to perform a wide array of tool operation and control functions. The electronic controllers 130 also include locks and/or the measurement circuits. For versions of the tool that include provisions for the tool to become disabled upon expiration of one or more particular time periods and/or upon reaching a particular time/date, any of which can potentially be prescribed by a user, the tool includes a real time clock and/or a timer. The measurement circuits can also include one or more "counters" that can be configured to count various aspects of tool operation such as a number of tool actuations. The tool 20 may also comprise electronic lock provisions 160 as described in greater detail herein. And, the tool 20 may also comprise one or more sensors collectively shown as 170 to sense one or more parameters, typically in real-time relating to tool use, operating conditions, and/or ambient conditions. Nonlimiting examples of such sensors include temperature sensors, pressure sensors, force sensors, electrical current sensors, electrical voltage sensors, accelerometers, counters, and time sensors to measure time periods of use or particular conditions of use. Many currently available tools and tool systems include electronic controls for operating the tool. Thus, one or more of components 110, 120, and 130 may in certain applications be readily configured in the tool(s) of interest. The communication provisions 140, 150 as previously described correspond to the communication format of the mobile device(s).

Electric or electronic lock provisions incorporated into smart tools of the present subject matter can take various forms and configurations. The lock provisions can be configured to enable tool use upon receiving an activation signal. Activation signals can be issued from the registration-and-control component or the mobile device, or can be based upon signals from both. Typically, an activation signal issues from the registration-and-control component and is relayed by the mobile device to a smart tool.

The electronic lock provisions, typically in the form of algorithmic instructions, can be executed entirely, or at least in part, by electronic circuitry incorporated into the smart tool. If such virtual electronic lock provisions are executed partially by the smart tool, the algorithmic instructions can be executed at the mobile device, and particularly by using the app described. Alternatively, or in addition, it is also contemplated that algorithmic instructions can be executed at the registration-and-control component.

Electronic lock provisions can also include one or more physical components such as a switch that connects or disconnects actuation circuit(s) and/or power supplies of the tool(s). In certain embodiments, the electronic lock provisions utilize one or more field effect transistors (FET) to provide switching or activation of the tool of interest. These circuits when used for enabling tool operation as described herein are referred to as FET-based electronic lock provisions. The present subject matter electronic lock provisions can be provided in a wide array of formats and configurations.

Methods

The present subject matter provides methods and techniques for governing and monitoring use of tool(s) registered in the system. Generally, many of the methods involve initially registering or updating a previously registered tool with the system and particularly with one or both of the registration-and-control component and/or the mobile device(s).

Figure 3:
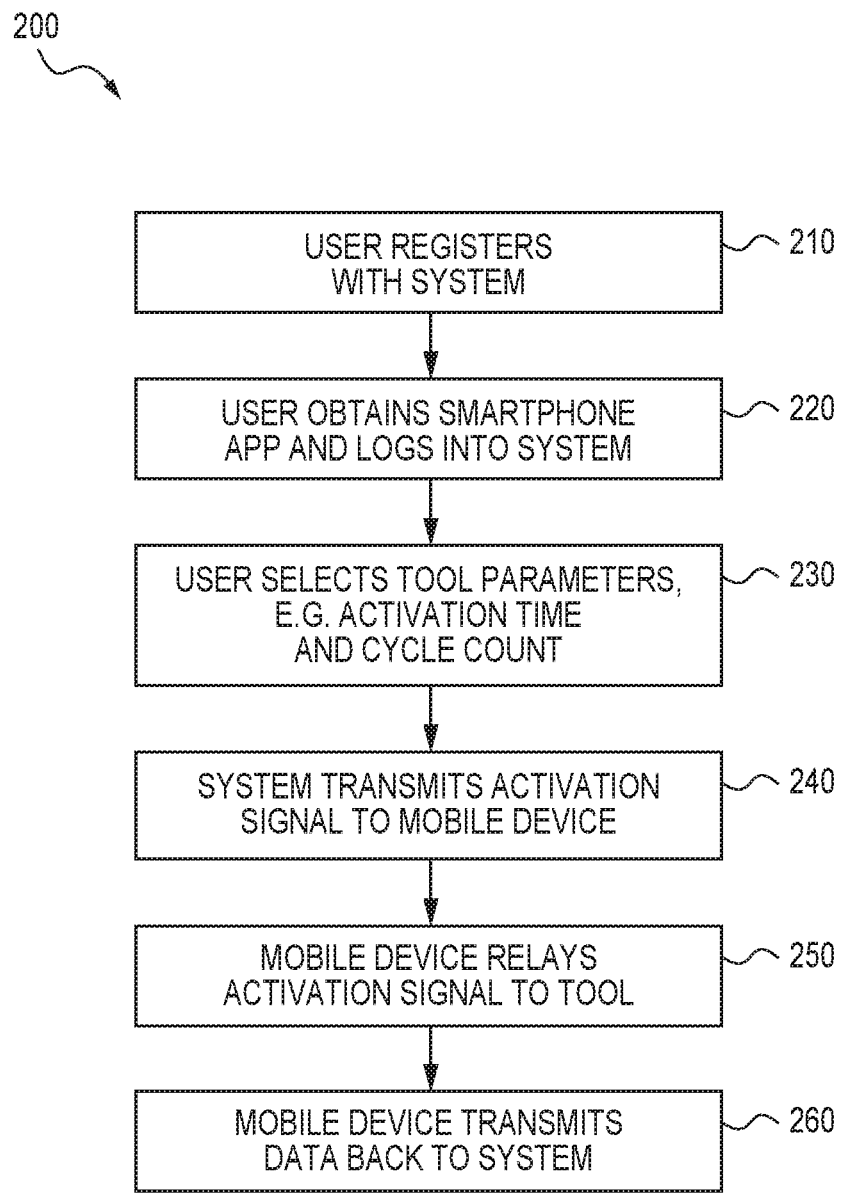
FIG. 3 is a schematic diagram illustrating a method of registering a tool with a system and continued use of the tool in accordance with the present subject matter.

FIG. 3 schematically depicts a method 200 in accordance with the present subject matter in which a tool is registered with a system such as registering the tool 20 with the system 10 in FIG. 1. The method 200 shown in FIG. 3 comprises one or more operations in which a user registers himself or herself with a system. These operations are collectively denoted as 210 in FIG. 3. The user registration operations may include the user providing identifying information, contact information, and information pertaining to the tool (s) of interest. The user registration operations may also include assigning a unique password and/or identification to the user.

The method 200 also comprises one or more operations collectively denoted as 220 in which the user utilizing one or more mobile devices, establishes identification between a mobile device such as a smartphone for example and the registration-and-control component. The operations 220 may also include obtaining or otherwise downloading an algorithm or app to the mobile device, to facilitate user control and operation of the tool(s) of interest and/or to facilitate communication and/or data exchange between one or both of (i) the tool and the mobile device, and (ii) the registration-and-control component. In many embodiments of the present subject matter, operations 220 are performed by a user establishing communication between the mobile device and the registration-and-control component, downloading an algorithm or app to the mobile device, and then using the algorithm or app and the mobile device, and entering a unique user password to log into the user's registration data or account maintained at the registration-and-control component.

Once logged into their account, a user may select one or more tool parameters and/or other items associated with the tool, user, and the like. These operations are collectively depicted in FIG. 3 as 230. For example, after logging into their account, a user can select how long a tool of interest shall remain operational. For example, a user may select an activation or operational time period of 24 hours, 1 week, 2 weeks, 1 month, 3 months, 6 months, or other time period. It will be understood that the present subject matter includes selection of activation or operational time periods less than these, greater than these, and/or different than these time periods. In certain embodiments, the system and/or tool is configured such that if an activation or operational time period of 1 month is selected, the tool of interest will remain operational at any time up to 1 month. After expiration of the 1 month activation time period, the tool is disabled and cannot be used until corrective action is taken. An example of such corrective action is a user logging into the system and re-activating the tool to cause the system to issue an activation code or electronic signal to the tool. In addition in certain embodiments, a user can select how many cycles or intervals of operation are permitted for a tool. For example, a user may select a number of cycles or intervals of operation as 10 cycles, 100 cycles, 500 cycles, 1,000 cycles, 10,000 cycles, or any other number of cycles. In addition, in certain embodiments, a user can select tool operation permitted until a predetermined end date or time. For example, a user may select tool operation permitted until a particular day or time in the future. Upon reaching that date, further tool use is prohibited. In addition, in certain embodiments, a user can select permitted operating ranges of tool(s). Alternatively, or in addition, a user can select certain parameters of the tool or use of the tool, which if sensed or experienced result in the tool being rendered inoperable. For example, if a certain number of cycles of tool use are exceeded, the tool is disabled. These and other user selectable parameters can be set during operation 230. These parameters can be entered and stored into the system at the registration-and-control component, the mobile device, or both. Regardless, the parameters are stored in the tool.

In certain embodiments, the method 200 also comprises one or more operations collectively denoted as 240 in FIG. 3, of transmitting an activation signal to the mobile device. The operation(s) 240 can also include establishing a communication link between the mobile device and the registration-and-control component. This link is schematically shown in FIG. 1 as links B, C. And, in certain embodiments, the method 200 additionally comprises one or more operations collectively shown as 250 in FIG. 3, of relaying the activation signal to the tool. The operation(s) 250 can also include establishing a communication link between the mobile device and the tool, which is schematically shown in FIG. 1 as link A. The method 200 can also include one or more operations 260 in which the mobile device transmits data to the system.

In many embodiments, during or after establishing communication link(s) between the mobile device and the tool of interest, an activation code or permission is transmitted or otherwise provided to the tool. Typically, the activation signal is issued from the system and relayed by the mobile device to the tool. Receipt of the activation code by the tool typically enables operation of the tool. The activation code or permission can be issued by the registration-and-control component and then relayed from the mobile device to the tool. Alternatively and as described in greater detail herein, in certain embodiments the system and tool(s) are configured such that the tool is initially enabled or permitted to operate and thus does not require an initial activation signal from the registration-and-control component and/or the mobile device. For example, a tool having electronic locking provisions can initially be provided by a manufacturer or supplier with such provisions in a deactivated state thereby allowing tool operation.

Figure 4:
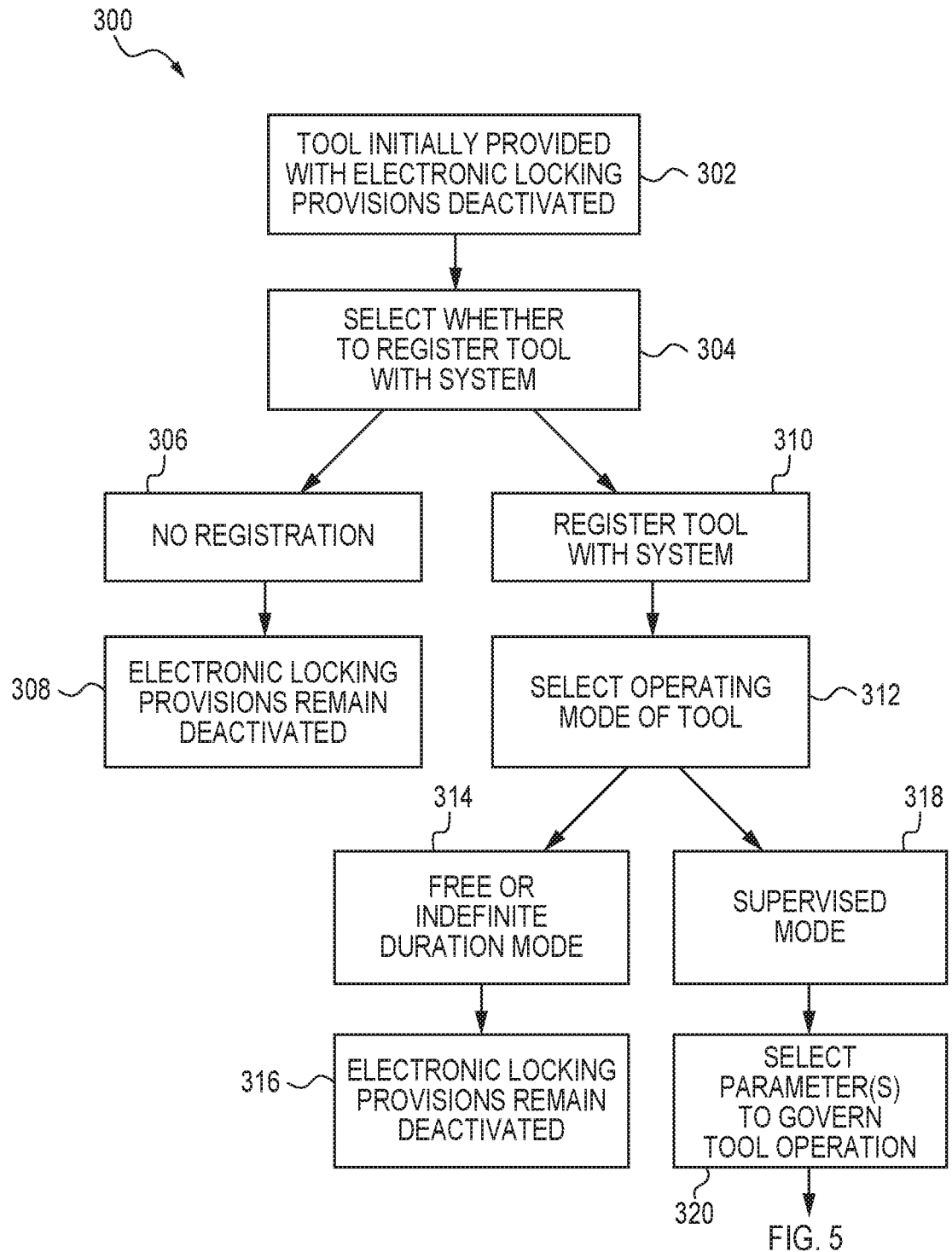
FIGS. 4-6 are schematic diagrams illustrating methods of governing tool use in accordance with embodiments of the present subject matter.
Figure 5:
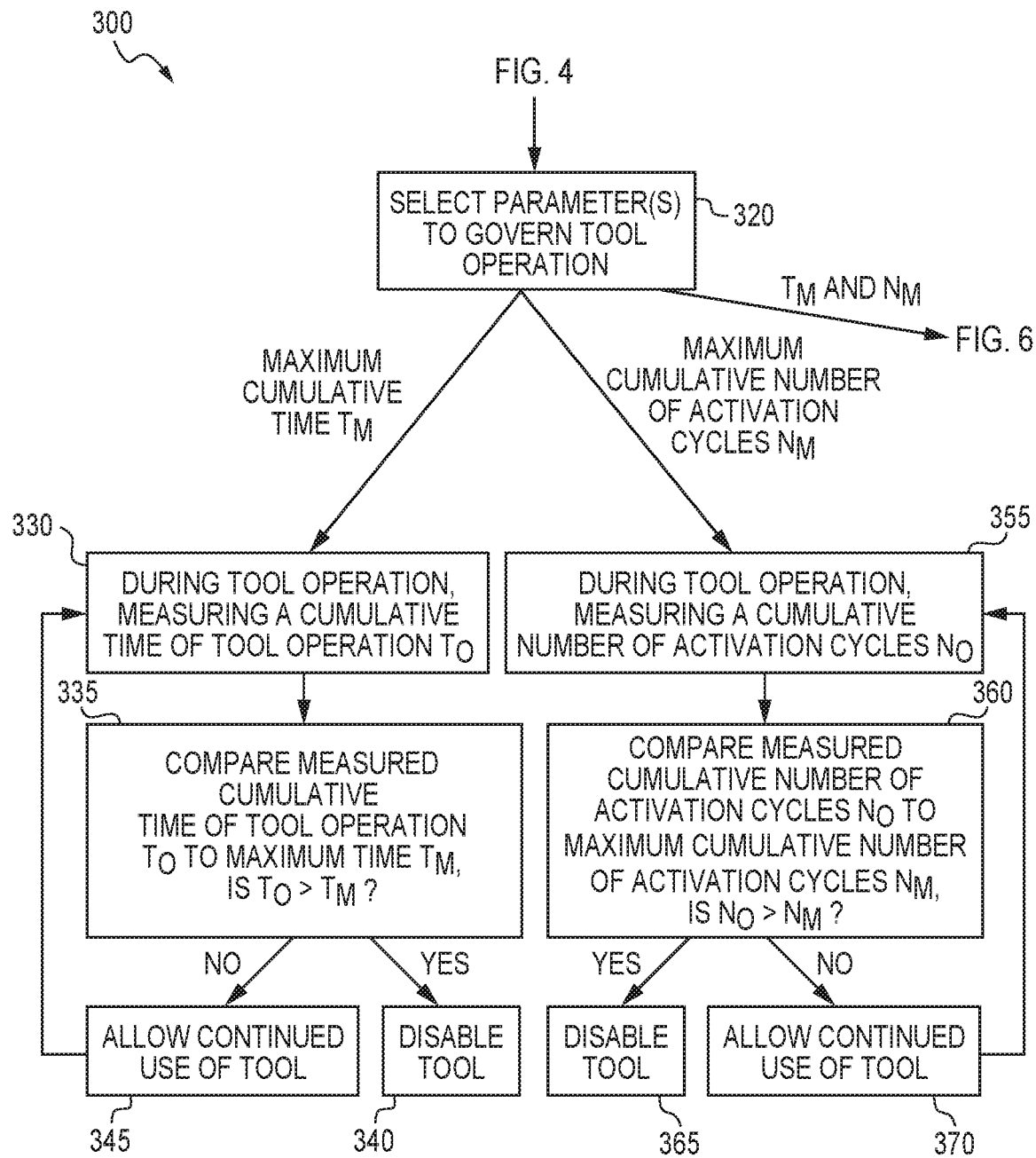
Figure 6:
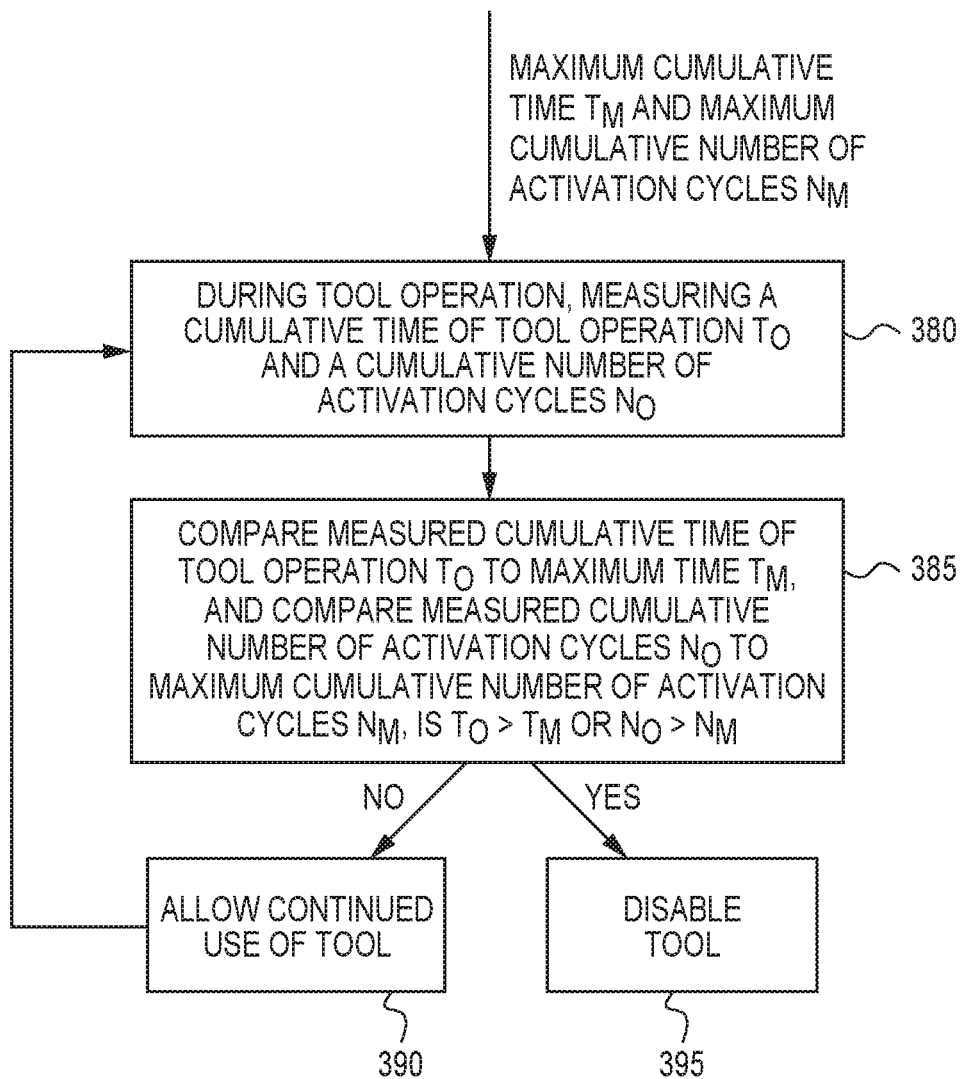

FIGS. 4-6 schematically illustrate methods of governing tool use in accordance with the present subject matter. In a method 300, a tool is initially provided with its electronic locking provisions deactivated. In this state, the tool can be operated in a conventional manner. This is shown in FIG. 4 as 302.

In operation 304, the tool user, owner, or other party selects whether to register the tool with the system. If the party decides to not register the tool, denoted at 306, then the electronic locking provisions remain deactivated as shown at 308.

If the party decides to register the tool with the system, denoted at 310, the party is then prompted at 312 to select an operating mode for the tool. If a "free" or "indefinite duration" mode (also referred to as an "infinite" or "infinite duration" mode) is selected, shown as 314, then the electronic locking provisions remain deactivated as depicted at 316.

If the party decides to register the tool and selects a "supervised" mode shown as 318, the party is then prompted to select one or more parameter(s) to govern tool operation. The parameters may include a maximum cumulative time Tm, a maximum cumulative number of activation cycles Nm, or both of these parameters. This is denoted in FIG. 5 as 320. It will be appreciated that the present subject matter is not limited to the use of these parameters and includes the use of one or more other parameters.

If the owner or supervisor selects maximum cumulative time Tm for governing tool operation, a timer is reset and the electronic locking provisions enable tool operation.

During tool operation, the tool measures a cumulative time of tool operation To, which is shown in FIG. 5 as 330. The measured cumulative time of tool operation To is compared to the maximum cumulative time of tool operation previously specified at 320. This comparison is depicted in FIG. 5 as 335. If To is greater than Tm, any further operation of the tool is prevented. The tool is disabled, as shown at 340. If however, To is less than Tm, the tool is allowed to operate as shown at 345. During further tool operation, the cumulative time of tool operation is measured, hence the method is repeated from operation 330, to comparison 335, to one of the results 340 or 345. If result 345 occurs, the method is again repeated from 330 as previously described.

If the owner or supervisor selects a maximum cumulative number of activation cycles Nm for governing tool operation, a counter is reset and the electronic locking provisions enable tool operation.

During tool operation, the tool measures a cumulative number of activation cycles No, which is shown in FIG. 5 as 355. The measured cumulative number of activation cycles No is compared to the maximum cumulative number of activation cycles Nm previously specified at 320. This comparison is shown in FIG. 5 as 360. If No is greater than Nm, then any further operation of the tool is prevented. The tool is disabled, as shown at 365. If however, No is less than Nm, the tool is allowed to operate as shown at 370. During further tool operation, the cumulative number of tool activation cycles is measured, hence the method is repeated from operation 355, to comparison 360, to one of the results 365, 370. If result 370 occurs, the method is again repeated from 355 as previously described.

If the owner or supervisor selects to disable the tool upon a first occurrence of either the maximum cumulative time Tm and the maximum cumulative number of activation cycles Nm, the previously noted timer and counter are reset. The tool is enabled for operation.

During tool operation, the tool measures both a cumulative time of tool operation To and a cumulative number of activation cycles No as shown at 380. The method compares the measured signals to the corresponding maximum cumulative time of tool operation Tm and the maximum cumulative number of activation cycles Nm previously specified. This comparison is shown in FIG. 6 as 385. If either (i) To is greater than Tm or (ii) No is greater than Nm, then any further operation of the tool is prevented. The tool is disabled, as shown at 395. If however, both (i) To is less than Tm and (ii) No is less than Nm, the tool is allowed to operate as shown at 390. During further tool operation, the cumulative time of tool operation and the cumulative number of tool activation cycles are measured, hence the method is repeated from operation 380, to comparison 385, to one of the results 390, 395. If result 390 occurs, the method is again repeated from 380 as previously described.

Figure 7:
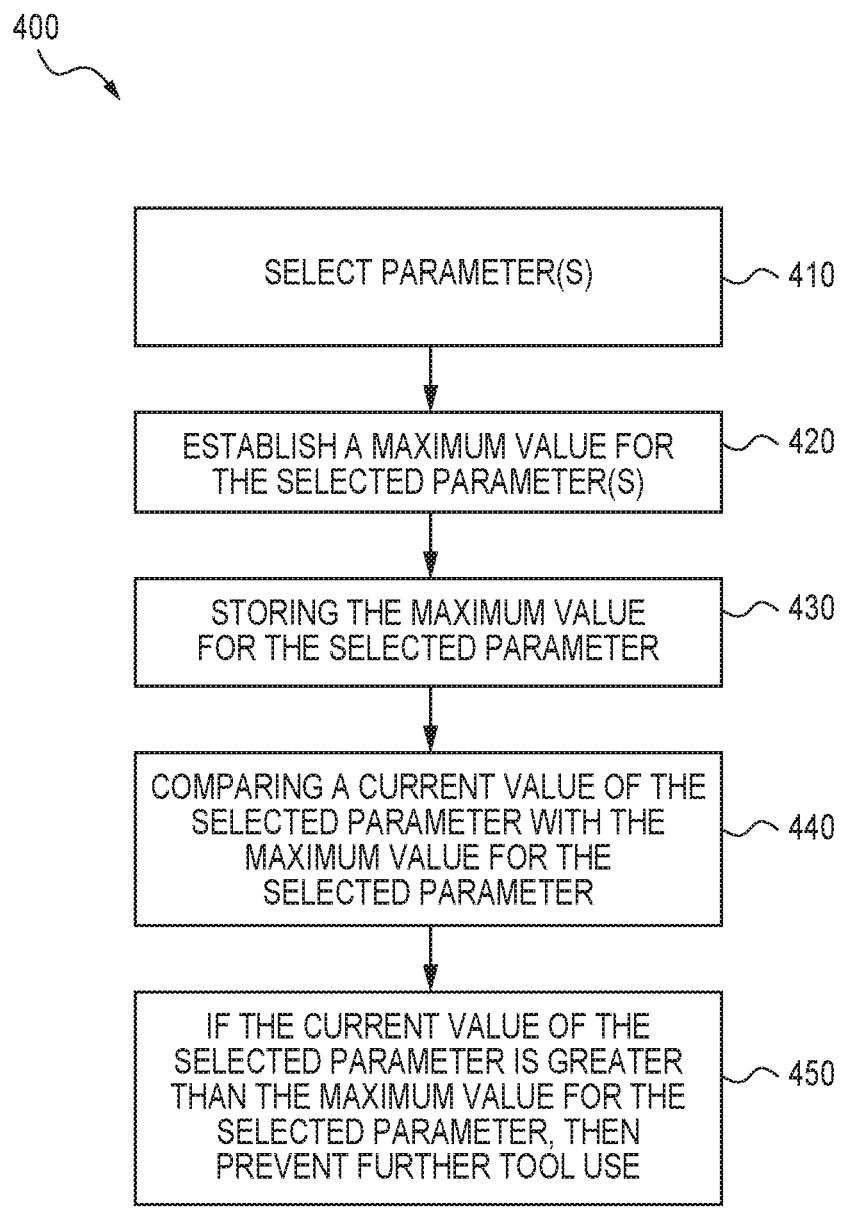
FIG. 7 is a schematic diagram illustrating another method of governing use of a tool in accordance with an embodiment of the present subject matter.

Thus, in particular versions of the present subject matter, methods are provided for governing use of one or more tools by selecting one or more parameters and designating maximum values or limits for the selected parameters, monitoring one or more selected parameters, and comparing current values to the designated maximum values. As previously described, nonlimiting examples of such parameters include an activation time period for the tool and a number of activation cycles. FIG. 7 schematically illustrates such a method 400. Generally, a method for controlling use of a tool comprises providing a system including (i) a registration-and-control component, (ii) at least one mobile electronic device, and (iii) at least one tool including electronic locking provisions. The mobile device is in communication with the registration-and-control component, and the electronic locking provisions are configured to enable operation of the tool. In certain embodiments, enabling the tool may require receipt of an activation signal. In other embodiments, the tools do not require an activation signal for operation. The method also comprises selecting at least one parameter which for example may be selected from the group consisting of (i) an activation time period, and (ii) a number of activation cycles. This is depicted in FIG. 7 as 410. The method also comprises establishing a maximum value for the selected parameter(s). This is shown as 420 in FIG. 7. For example, if the selected parameter is a tool activation time period, the maximum value for that parameter may be selected to be 1 month. Another example may be if the selected parameter is a number of tool activations, i.e., discrete uses of the tool, the maximum value for that parameter may be selected to be 500 activations. The method also comprises storing the maximum value for the selected parameter(s) on the tool. This is shown as 430 in FIG. 7. The method also comprises comparing a current value of the selected parameter with the maximum value for the selected parameter. This is shown as 440 in FIG. 7. If the current value of the selected parameter is greater than the maximum value for the selected parameter, then further use of the tool is prevented, such as shown at 450. In particular versions of the method 400, the selected parameter is an activation time period in the form of an expiration date and the tool further includes data storage provisions. The method further comprises storing the expiration date in the data storage provisions in the tool. In this embodiment, the tool includes a real time clock. The comparing is performed by comparing the expiration date stored in the data storage provisions with a real time date provided by the system, and if the real time date is after the expiration date, the electronic locking provisions of the tool are actuated to thereby disable operation of the tool. It will be understood that the present subject matter includes the use of a wide array of parameters for governing tool use. Thus, the present subject matter is not limited to the particular examples of an activation time period and/or a number of activation cycles.

In additional embodiments, the tool can be configured to monitor time of use. This aspect is beneficial in a number of applications. For example, monitoring total time of use when using certain cutter inserts with the tool is beneficial. After exceeding a particular total time of use, the cutter inserts may need to be changed. After a certain amount of time, an LED or other indicator is actuated to indicate the required change of the cutter inserts. After the inserts have been changed, the user connects with a mobile device to reset the LED and a counter or timer. During this connection, data between the device (and subsequently the device and the server) is exchanged.

In certain embodiments, the present subject matter systems and methods provide an array of additional features and functions as follows.

Preventing Tool Use

In many embodiments of the present subject matter, the systems prevent use of one or more tools based upon particular criteria and/or conditions.

Typically, the tool includes electronic locking provisions configured to disable tool use without requiring transmission of a deactivation signal to a tool. After disabling a tool such as by previously configuring the tool, the system can be configured such that the tool remains inoperable until the user activates the tool by logging into the system and accessing his or her account with the registration-and-control component. Upon logging into their account and permitting use, a permission signal is transmitted to the tool such as from the mobile device to the tool by BLUETOOTH.

In particular embodiments, when logging into the system from an electronic mobile device, the user can declare the device as his own and a permanent code can be issued to, and stored onto, the mobile device (or another trusted electronic device). Now the electronic mobile device can be used any time to activate a smart tool without logging into the smart tool system. Thus, the permanent code serves as a "permanent key" for the tool. Alternatively, a "one-time code" can be issued that allows the user to use the mobile device only once for tool activation. Before using the device a second time, the user must establish a new connection to the system and obtain a new code.

In many embodiments of the present subject matter, a tool adapted for use with the system is initially provided or sold with the electronic lock disabled or inactive. Thus, any user who does not wish to use the electronic lock or register the tool with the system, can use the tool in a conventional fashion and without any further action.

Monitoring Tool Use

In certain embodiments of the present subject matter, various aspects of tool use can be monitored. For example, the system can be configured to collect and store data relating to tool use and transmit such data to a mobile device for subsequent uploading or transfer to the registration-and-control component. In certain versions, the system collects information relating to the time and duration of tool use. This enables a party such as a business owner or jobsite supervisor to monitor whether any unauthorized use such as after hour use of the tool(s) has occurred.

The present subject matter systems can also be configured to monitor, store, and/or display status information relating to each tool of interest.

Providing Information to User

The present systems can also provide a wide array of information and data to a user concerning tool(s) of interest and their use. The systems can be configured to send automated emails or other communications such as text messages to designated users or other parties, e.g., tool service reminders, notification of tool deactivation, etc.

Memory or data storage provisions incorporated in a tool or in a mobile device which have received tool data, can provide information to a user for display or further processing. For example, statistical processing of tool use data can be performed to provide information to users, other parties, and/or tool manufacturers.

Particular Features

As will be appreciated, the present subject matter systems and methods can be configured to provide a wide array of particular features.

In certain embodiments, a tool in accordance with the present subject matter and including electronic lock provisions is initially provided, sold, and/or provided to a user with the electronic lock provisions set to infinite use. This provides the user with an option of whether to utilize the electronic lock provisions. If the user decides to not use the provisions, such as if the user does not have access to a computer, the tool can be operated in a conventional fashion. More specifically, in many embodiments of the present subject matter, the electronic locking provisions are activatable and typically activatable by a user, operator, supervisor, or other party. Typically, after manufacture and assembly of a tool and upon purchase of the tool, the electronic locking provisions are set to allow infinite use, thereby allowing tool operation regardless of whether the tool is registered or used with the systems described herein.

In certain embodiments, activation signals from the registration-and-control component and relayed by the mobile device(s) include one or more activation codes that may include instructions for the tools and components of the tools. For example, the activation codes may include instructions for the tool and/or its electronic locking provisions to enable operation of the smart tool upon receipt of the activation code. The activation codes can be created or generated by the registration-and-control component and selectively issued to the mobile devices. Embodiments are also contemplated in which a mobile device is configured to store multiple activation codes. Thus, if a tool becomes disabled in the field such as due to exceeding a maximum cumulative time of tool operation, an operator could use a mobile device to issue another activation signal with an activation code to enable the tool to be used again. Re-activation of a tool using the mobile device would not require communication between the mobile device and the registration-and-control component. Alternatively, users can designate a mobile device as a "trusted device," to enable tool use without further connection with the server.

In certain embodiments, tools and/or the system can be configured such that any comparison of a current value to a selected parameter, e.g., an activation time period, a number of activation cycles, or tool use parameter, with a maximum value selected for that parameter, is performed prior to tool use. In particular embodiments, tools and/or system can be configured such that the comparing is only performed prior to use of the tool. This enables a user to finish a particular use or application of the tool.

In certain embodiments, tools can be configured to only operate within a predetermined time period and/or within predetermined operating parameters such as up to a designated number of operating cycles.

In certain embodiments, the systems can be configured to transmit, store, and/or display information concerning tool(s) and their use such as cycle counts, pressure data, warnings, and the like. Specifically, in particular embodiments of the present subject matter various data concerning tool use is collected and stored on the tool. Nonlimiting examples of such data include dates and times when the tool was used; if the tool is a press or crimp tool, data concerning crimp pressure, size of fittings pressed, and other associated measurements; temperatures during tool use; number of tool uses or actuations; and other information collected from sensors incorporated in the tool. The various data is stored in electronic data storage provisions onboard the tool. The data can be transferred or transmitted to one or more mobile device(s) in a subsequent communication between the tool and the mobile device. Once transferred to the mobile device, the data or a portion thereof can be transferred to the registration-and-control component or to other components of the system as desired.

In certain embodiments, systems can be configured to transmit "alerts" about tool service, and activation details, derived or determined from monitored tool use data.

In certain embodiments, reminder signals or other notifications may be issued by the system prior to expiration of any tool deactivation time periods or cycle counts. Therefore, before disabling a tool, a reminder signal is issued to warn of the tool nearing conditions for it to be disabled. For example, if a smart tool is configured with a 1-week (only) use-period limitation, a warning can be issued by the smart tool system prior to expiration of the 1-week time period, such as for example 24 hours prior to expiration. Such a warning could provide a user with time to reset the smart tool parameter limit prior to expiration and resulting smart tool deactivation. For example, depending upon system configuration, a user could send an appropriate signal between his smartphone and the smart tool to revive tool functionality using an app running on the smartphone.

In certain embodiments, the tools can be provided with one or more illuminated indicators that emit light upon the locking provisions being in a state that prevents tool operation. For example, the illuminated indicator could be a light emitting diode (LED) which is activated to emit light upon the locking provisions disabling tool use. Referring to FIG. 1, the tool 20 could include one or more illuminated indicators 20a and 20b that emit light such as red, yellow, or green light to indicate a locking state or other state of the tool.

The system can also be configured such that one or more tools can be activated or re-activated, using a primary or master activation or deactivation code.

The systems and/or electronic locking provisions allow tool use when a communication link is not established, such as if a data connection link between a tool and a mobile device cannot be established or is temporarily lost during tool use. Deferred updating of the tool use data and/or user information retained with the registration-and-control component can occur upon a subsequent data connection such as between the mobile device and the registration-and-control component, i.e., via the cloud.

In certain embodiments, the present subject matter also includes tools that include labels, tags, stickers, molded indicia, or other means to indicate that the tool includes electronic locking provisions. These are collectively referred to herein as "visual indicia." The visual indicia provide a clear visually perceptible warning that the tool includes anti-theft provisions, e.g., the electronic locking provisions and/or the additional aspects described herein. Referring to FIG. 1, the tool 20 is depicted as including visual indicia 20c which may for example be a label that is adhesively secured to the tool 20. The label 20c may convey that the tool includes electronic locking provisions and/or can be used with or registered with a system or database of the tool's manufacturer or supplier.

The present subject matter provides various advantages and benefits including the following. No permanent connection to a mobile device is required. Once activated, the tool can be used until one or more parameter(s) expire. No costly cell connection is required unlike other devices such as for example plug-in devices for cars. All communication is "relayed" via the mobile device, using data connection already associated with the mobile device and/or its use. In still another aspect, the present subject matter provides embodiments of methods for governing use of a smart tool. The term "smart tool" as used throughout this patent specification shall be understood to mean a tool that is configured with a variety of electronic communication provisions. More particularly, as used throughout this patent specification a smart tool shall be understood to be a tool that is configured to have electronic communication provisions selected from the group including but not limited to: (i) electronic tool-lock provisions; (ii) electronic communication provisions (wireless and/or cellular); (iii) electronic data-storage provisions; and (iv) combinations thereof. For such a purpose, the tool-lock provisions can be functionally and operatively configured to prevent smart tool use and also can be functionality based upon at least one parameter limit. Such a parameter limit can be selected from predetermined conditions which include but are not limited to: (i) number of smart tool actuations; (ii) date; (iii) period of time; (iv) number of cycles; (v) amount of time; (vi) distance from a specified location; and (vii) combinations of (i)-(vi).

In addition, the present subject matter provides a method that comprises providing a system including (i) a registration-and-control component, (ii) at least one mobile device, and (iii) at least one smart tool including electronic communication provisions as well as electronic locking provisions. The method includes registering the smart tool with the registration-and-control component. The method also includes selecting at least one parameter to govern smart tool operation. The method also comprises transmitting the parameter to the smart tool to govern its operation. The smart tool remains operational until disabled based upon the selected parameter whereby the smart tool de-activates itself and without receiving any deactivation signal from any other source.

In yet another aspect, the present subject matter provides at least one other method for governing use of a smart tool. Such method comprises providing a system including (i) a registration-and-control component, (ii) at least one mobile device, and (iii) at least one smart tool including data-storage provisions, communication provisions, and electronic-locking provisions. Such method also comprises specifying a maximum amount of cumulative time during which the tool is operational. The method additionally comprises storing the specified maximum amount of cumulative time during which the smart tool is operational in the data-storage provisions of an associated smart tool. The method includes resetting a timer, thereby causing the electronic-locking provisions to enable smart tool operation. The method also comprises during smart tool operation, measuring a cumulative time of tool operation. And, the method comprises comparing the measured cumulative time of smart tool operation to the specified maximum amount of time, cumulative or otherwise, during which the smart tool is allowed (i.e., requested and/or authorized) to be operational. For instance, if the measured cumulative time of smart tool operation is greater than a user-specified maximum amount of cumulative time during which a designated smart tool is allowed (i.e., requested and/or authorized) to be operational, the electronic-locking provisions disable the designated smart tool.

In another aspect, the present subject matter also provides a method for governing use of a smart tool. Such method comprises providing a smart tool system including (i) a registration-and-control component, (ii) at least one mobile device, and (iii) at least one smart tool including data-storage provisions, electronic-communication provisions, and electronic-locking provisions. The method also comprises specifying a maximum cumulative number of actuation cycles during which a designated smart tool is operational. The method includes storing the specified maximum cumulative number of actuation or operational cycles during which the designated smart tool is operational in the data-storage provisions of the associated designated smart tool. Such method further comprises resetting a counter, thereby causing the electronic locking provisions to enable, that is, re-establish the operability of a disabled smart tool. The method also comprises, during smart tool operation, indexing or counting a specified cumulative number of preselected actuation cycles. The method includes comparing the indexed or counted cumulative number of actuation cycles with a maximum cumulative number of actuation cycles during which the smart tool is operational. If the counted cumulative number of actuation cycles is greater than the specified maximum cumulative number of actuation cycles during which a smart tool is authorized or allowed to be operational, the electronic-locking provisions disable operation of the smart tool.

In still another aspect, the present subject matter provides a method for governing use of a smart tool. The method comprises providing a smart tool system including (i) a registration-and-control component, (ii) at least one mobile device, and (iii) at least one smart tool including communication provisions and electronic-locking provisions. Suitable mobile devices for purposes of the present subject matter include, but are not limited to, notebook computers, laptop computers, netbooks (also known as mini notebook or subnotebook computers), smart phones (also spelled "smartphones"—one word), and various handheld-sized computers (collectively referred to as "personal digital assistant" or PDA). The method includes specifying a predetermined maximum amount of cumulative time during which the smart tool is operational and/or a maximum cumulative number of actuation cycles during which the smart tool is to be operational. The method includes storing the specified maximum amount of cumulative time during which the smart tool is to be operational and/or the maximum cumulative number of actuation cycles during which the smart tool is to be operational in the data-storage provisions of the associated smart tool. The method includes, during tool operation, measuring by keeping track of (e.g., by counting or indexing) the cumulative time of smart tool operation and/or similarly counting or indexing the cumulative number of actuation cycles. The method includes comparing the measured cumulative time of tool operation to the specified maximum amount of cumulative time during which the smart tool is allowed to be operational and comparing the cumulative number of actuation cycles with the specified maximum cumulative number of actuation cycles during which the smart tool is allowed to be operational. Upon a first occurrence of (a) the measured cumulative time of tool operation being greater than the specified maximum amount of cumulative time during which the tool is allowed to be operational and (b) the cumulative number of actuation cycles being greater than the specified maximum cumulative number of actuation cycles during which the smart tool is allowed to be operational, the method causes the electronic-locking provisions to disable smart tool operation. Other non-limiting examples of operational parameter limits include (i) predetermined dates (e.g., only Mondays, Wednesdays, Fridays in a specified month); (ii) predetermined periods of time (e.g., only between 6:00 am-noon between, Monday-Friday or only between 9:00 am-5:00 pm, Monday-Friday); (iii) a predetermined number of cycles (e.g., 10 cycles, 100 cycles, 500 cycles, 1,000 cycles, or 10,000 cycles); (iv) a predetermined number of smart tool actuations (e.g., 10; 50; 100; 500; 1,000; 5,000 or 10,000 "trigger pulls"); (v) a predetermined period or amount of time (e.g., 1 hour, 3 hours, 6 hours, 24 hours, 1 week, 2 weeks, 1 month, 3 months, 6 months, or 1 year); (vi) a preselected or predetermined distance (e.g., 500 feet, 2,000 feet, 1 mile or 5 miles) from a preselected job site or other predetermined location, as well as combinations of (i) through (vi).

In yet another aspect, the present subject matter provides a smart tool system for governing use of at least one smart tool. The smart tool system comprises a registration-and-control component having data-storage provisions as well as electronic data-communication provisions. The smart tool system includes at least one mobile electronic device including data-storage provisions, and/or electronic communication provisions, user-interface provisions, and smart tool operational control provisions. The mobile device is capable of communication with the registration-and-control component. The mobile device is able to transmit an authorization or actuation signal including an authorization or actuation code to the registration-and-control component. Moreover, the smart tool system includes at least one smart tool having data-storage provisions, electronic communication provisions, and authorizable or tool-actuatable provisions. The smart tool is capable of electronically communicating with the mobile device and receiving the actuation signal from the mobile device. The electronic lock provisions are configured to enable operation of the smart tool upon receipt of the actuation code. In the smart tool system of the present subject matter, the various cellular communication links discussed can be selected from the group consisting of 2G, 3G, LTE, and 5G. In still another aspect, the present subject matter provides a smart tool that has activatable electronic locking provisions, initially provided in (i) an indefinite mode to allow smart tool operation indefinitely, or (ii) with select parameters "set" to allow indefinite use.

Additional Aspects

The present Assignee of this application received U.S. Pat. No. 10,437,228. The '228 patent describes a smart tool system which includes a special tool also known as a smart tool that has electronic-locking capabilities (also referred to as a "smart tool" herein), a mobile device (e.g., a smartphone, a laptop computer, a desktop computer, a personal digital assistant, occasionally simply referred to as a PDA), and a conventional cloud-based infrastructure (often referred to conventionally simply as "the cloud") which includes a conventional registration-and-control component or unit capable of providing electronic communication between at least one, and preferably more, smart tools and the registration-and-control component unit (e.g., the cloud server). After authorization of the mobile device by the cloud server, a user could connect, e.g., via conventional wireless or cellular connection systems, to such a smart tool with a smartphone using a conventional wireless connection, such as for example Bluetooth, Wi-Fi, or NFC, to set or change a parameter limit on the smart tool. Such a parameter limit (e.g., number of cycles; times-of-day; calendar dates; within specified regions; etc.) specifies a use limit for the smart tool. After expiration of a use limit or if a specified use limit condition is met, the smart tool locks itself automatically, without any additional user interaction and without any additional connection to the smartphone or the registration-and-control unit.

In certain embodiments, an authorized user is required to connect to such a smart tool with a smartphone via conventional Bluetooth or NFC wireless connection systems in order to re-set the parameter limit and thus unlock the tool, for enabling the tool to again be operational. Incidentally, any of the use limit parameters could also be set to "indefinite" use, for allowing "infinite" use of the tool without it ever locking itself.

Thus, in regard to the present subject matter, at least one new parameter limit can be authorized and transmitted via a first electronic (either wireless or cellular) communication link or a second electronic (either wireless or cellular) communication link or via the first and second electronic communication links: (1) either to a disabled smart tool for enabling the disabled smart tool to again become operational subject to new parameter limits, (2) or for enabling a still-enabled smart tool to remain operational subject to new parameter limits. For example, a disabled tool can become operational for another 100 cycles or for another 100 trigger pulls as a result of receiving the new parameter limits. Or a still-enabled smart tool, that has say, 3 trigger pulls left, can be "re-set" (from 3, instantaneously) to 100 trigger pulls, as a result of receiving the new parameter limits. Also, the present subject matter provides a user with a smart tool that has activatable electronic locking provisions, initially provided in an indefinite mode to allow smart tool operation with certain parameters "set" to allow indefinite use, while certain other smart tool operational parameters remain "locked" for an indefinite period of time. Such "limited" operation, enables electronic tool-lock systems of the present subject matter to deter theft, since potential thieves will be made aware, e.g. by labels on a tool, that such a tool will have limited, or no, value to an unauthorized user.

Moreover, while the smart tool is connected to the smartphone, other use data can be transferred from the smart tool memory to the smartphone. Such use data can then be transferred from the smartphone to the registration-and-control component of the cloud server for the purpose of further analyzing the data, resulting, for example, in the programming or composition of preventative maintenance alerts or usage reports to which an authorized user would have access through any mobile device or computer.

Independent From Smartphone Connection

A user may not always carry a cell phone on the jobsite or the tool owner and the user may not be the same person. In the event a smart tool becomes disabled as the result of a use limiting parameter being met, the tool would be unusable until an authorized smartphone user reset the parameter limit of the disabled tool. Downtime may lead to disruptions and loss of productivity. The present subject matter addresses this problem. Authorized users or owners of the tool can unlock the tool remotely from any device with an internet connection, as long as the tool is powered and within cellular range. In addition, authorized users or owners can also lock a smart tool remotely from any internet enabled device, as long as the tool is powered and within cellular range.

GPS Tracking

The present subject matter also enables easier tracking of the physical location of the tool. The tool can be equipped with a GPS module. Such GPS modules are typically in the form of electronic circuitry and are capable of identifying their location and providing coordinates for the GPS-tracked location. If an owner or authorized user wants to know the physical location of the tool, the owner or user can send a signal from an internet enabled device to the cloud server, which in turn can "ping" the tool via the cellular connection. As long as the smart tool is powered "on" and within cellular range, it can send back its GPS coordinates. The tool can also be configured to send its GPS coordinates every time it is powered on, thereby allowing an owner to monitor the tool.

Communication can be Initiated Either by the Smart Tool or by the Cloud Server

Smart tools of the present subject matter can be configured to store use information and can regularly connect to the cloud server wirelessly for example via a cellular connection, to transmit usage data and/or GPS coordinates. No action from the tool user is required, for the reason that data transfer can occur without user interaction, automatically, at various preselected (i.e., preprogrammed) time intervals, dates, etc.

Figure 8:
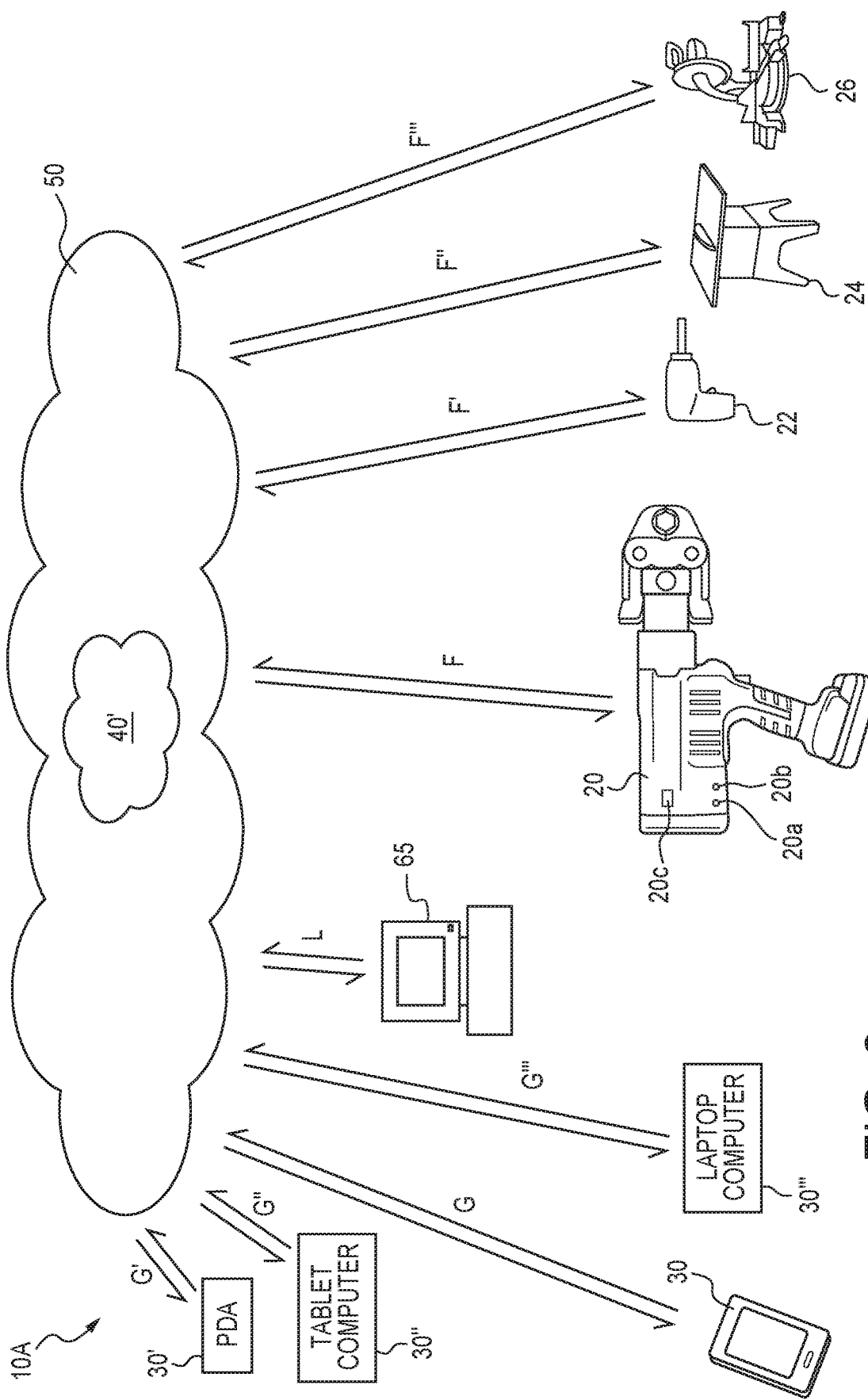
FIGS. 8 and 9 are schematic illustrations of embodiments of tool systems in accordance with the present subject matter.
Figure 9:
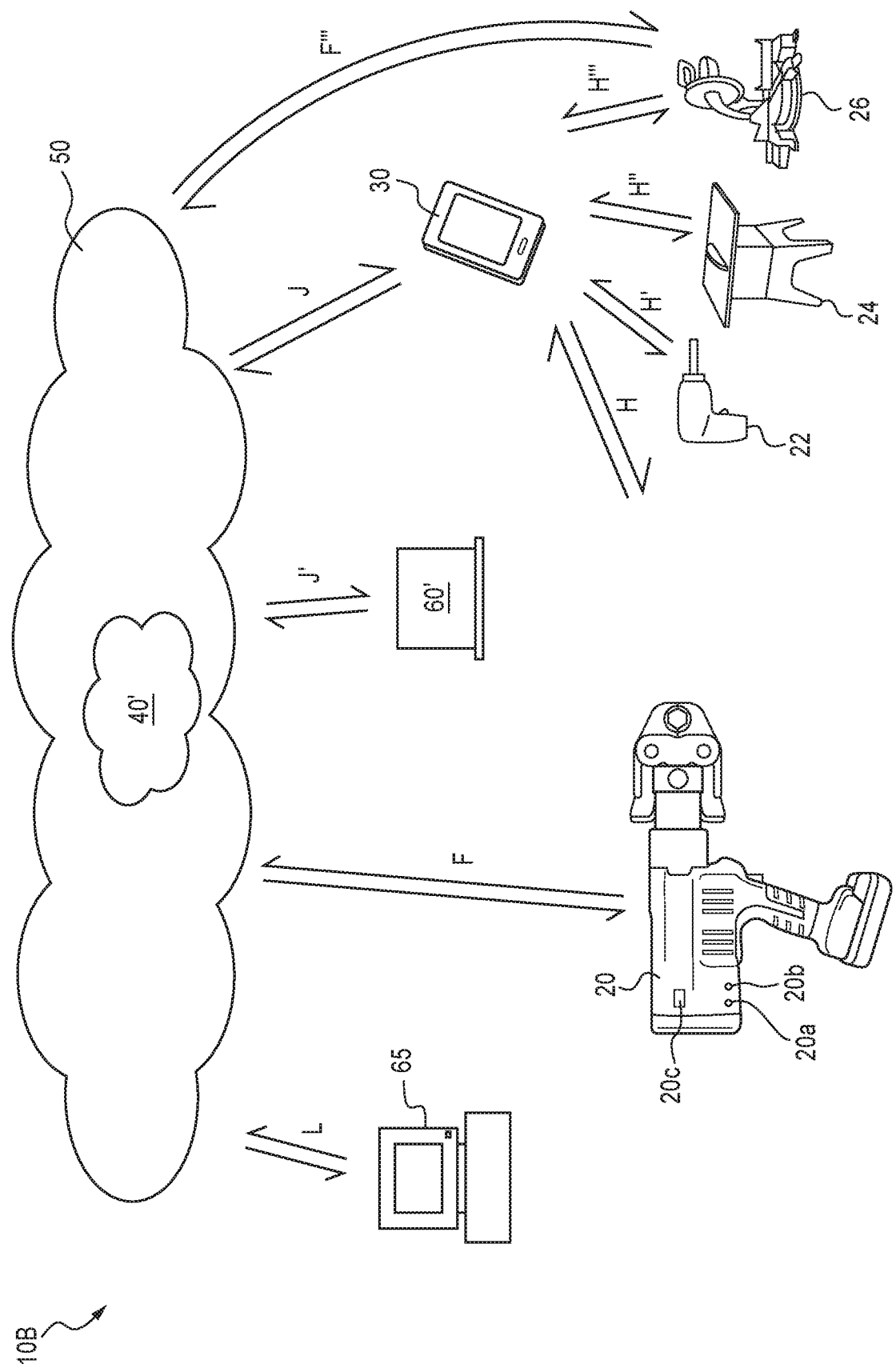

As noted, instead of, or in addition to, connecting to a smartphone via Bluetooth, Wi-Fi, NFC or similar protocols as described herein, a smart tool can also connect directly to the cloud server using a conventional cellular (2G, 3G, LTE, 5G) or other suitable connection. In embodiments, a smart tool can include a cellular radio, or cellular communication provisions, that can be programmed to establish a connection to a cloud server, as well as sending and receiving select data. FIGS. 8 and 9 illustrate embodiments of smart tool systems in accordance with the present subject matter.

FIG. 8 schematically illustrates yet another embodiment of a smart tool system 10A in accordance with the present subject matter. The smart tool system 10A illustrated comprises one or more smart tools 20, 22, 24 and 26; one or more electronic mobile devices 30, 30', 30" and 30"'; and a conventional cloud-based infrastructure 50 ("the cloud 50") which includes a registration-and-control component 40' for providing communication between the one or more electronic mobile devices 30, 30', 30" and 30"' and the one or more smart tools 20, 22, 24, and 26. As an example of one such smart tool, FIG. 8 depicts a handheld battery-powered tool 20 having one or more indicators 20a and 20b, and visual indicia 20c, and including (i) electronic data-storage provisions; (ii) electronic communication provisions; and (iii) electronic tool-lock provisions, where these smart tool provisions, as discussed above and as will be described further below, are applicable to smart tools, in general, in accordance with the present subject matter. The smart tool system 10A illustrated by FIG. 8 comprises one or more electronic communication links F, F', F" and F"', respectively, between each smart tool 20, 22, 24 and 26 and the registration-and-control component 40' of the cloud 50. The illustrated nonlimiting examples of smart tools incorporating the present subject matter include a handheld drill 22 which can communicate with the cloud 50 via at least one such link F', a table saw 24 which can communicate with the cloud 50 via at least one such link F", and a miter saw 26 which can communicate with the cloud 50 via at least one such link F"'. The illustrated smart tools 20, 22, 24 and 26 as well as other smart tools within the scope of the present subject matter, include the following smart-tool provisions, namely: (i) electronic data-storage provisions; (ii) electronic communication provisions; and (iii) electronic tool-lock provisions. Furthermore, the electronic communication provisions include wireless and/or cellular communication provisions; and the tool-lock provisions include devices for locking or otherwise disabling a particular tool, automatically, after a tool operation parameter limit or other condition has occurred. Nonlimiting examples of tool operation parameter limits include number of cycles (e.g., no more than 10, 25, 50, 100, 500 cycles of operation; or no movement beyond 100 meters, 200 meters, or 300 meters from a specified location or job site; or no smart tool operational activity between specified times-of-day, such as, 9:00 am and 5:00 pm; and combinations of these limits). Additional nonlimiting examples of such smart tools include temperature-measurement devices such as thermal cameras, or visual-inspection devices such as drain inspection cameras, each of which include these smart-tool provisions: (i) electronic data-storage provisions; (ii) conventional electronic communication provisions; and (iii) conventional electronic tool-lock provisions. Thus, in the smart tool system 10A shown in FIG. 8, the illustrated smart tools 20, 22, 24 and 26 can communicate by wireless connection or via cellular connection, directly with the registration-and-control component 40' of the cloud 50 via communication links F, F', F" and F"', respectively. In accordance with the present subject matter, the electronic mobile devices shown include a smartphone 30, a PDA 30', a tablet computer 30" and a laptop computer 30"' any one of which can be configured to communicate by wireless connection or cellular connection, directly with the registration-and-control component 40' of cloud 50 via communication links G, G', G" and G"', respectively. In addition, the smart tool system 10A depicted in FIG. 8 can include at least one desktop computer 65 electronically configured to electronically communicate via communication link L with the registration-and-control component 40' of the cloud-based architecture ("the cloud") 50 described above. Further, the present subject matter contemplates additional variations (not depicted), in which at least one desktop computer 65 could be configured electronically to communicate directly, using wireless or cellular connection, with at least one of the smart tools 20, 22, 24, and 26.

In addition, FIG. 9 schematically depicts an embodiment of yet another smart tool system 10B in accordance with the present subject matter. The smart tool system 10B depicted comprises one or more smart tools 20, 22, 24 and 26; at least one mobile device 30; and conventional cloud-based infrastructure ("the cloud") 50 which similarly includes a conventional registration-and-control component 40' capable of providing electronic communication between one or more mobile devices 30 and 60' and the one or more smart tools 20, 22, 24 and 26. In particular, as previously noted—as an example of what else the other illustrative tools 22, 24 and 26 could include—the handheld tool 20 includes one or more battery-illuminated indicators 20a and 20b and visual indicia 20c. Similar to the electronic communication links F, and F''' discussed in connection with FIG. 8 and representing direct electronic communication between each of the smart tools 20 and 26 and the registration-and-control component 40' of the cloud 50, the smart tool system 10B shown in FIG. 9 includes the electronic communication link F, representing direct electronic communication between the tool 20, as well as the electronic communication link F''' representing direct electronic communication between the smart tools 26, with the conventional registration-and-control component 40' of the cloud 50. In addition, the smart tool system 10B shown in FIG. 9 comprises one or more electronic communication links, each either wireless or cellular, H, H', H" and H''' directly between each of the smart tools 20, 22, 24 and 26, respectively, and the at least one mobile device 30. Specific examples of mobile electronic devices contemplated by the present subject matter are noted throughout this patent specification. Nonlimiting examples of smart tools capable of electronically communicating with the conventional registration-and-control component 40' of cloud 50 via at least one such communication link H, H', H" and H''' include pressure and/or temperature measurement and recording devices and physical data-gathering devices and/or visual data-gathering devices such as IR-based or other thermal cameras or underground inspection devices such as drain inspection cameras. System 10B, shown in FIG. 9, further includes and depicts one or more electronic communication links, F, directly between the handheld smart tool 20 and the registration-and-control component 40' of cloud 50. Moreover, communication link F''' provides a direct electronic communication link between the smart tool 26 and the registration-and-control component 40' of cloud 50. Such electronic communication links F and F''' can be accessed by an authorized user in addition to, or instead of, any of the communication links H, H', H" and H''' between the tools 20, 22, 24 and 26 and the at least one mobile device 30 shown in FIG. 9. System 10B also includes one or more electronic communication link J between the at least one mobile device 30 and the conventional registration-and-control component 40' of cloud 50, as shown in FIG. 9. Moreover. smart tool system 10B further includes at least one tablet or laptop computer 60' configured to communicate via conventional wireless or cellular link J' electronically with the registration-and-control component 40' of the cloud 50. Also, the smart tool system 10B can include at least one desktop computer 65 configured to electronically communicate with the registration-and-control component 40' of the cloud 50 via link L. The present subject matter also includes variations of these systems. For example, the computers 60 and/or 65 could be configured to electronically communicate directly with at least one of the tools 20, 22, 24 and 26. Thus configured, the computers 60 and/or 65, would function as a mobile device in accordance with the present subject matter.

Such operational communication and connection to a particular smart tool can be initiated by an authorized user and sent either to the cloud server or the smart tool. This allows an authorized user or the smart tool owner, to reset a use parameter for example to unlock the designated smart tool, from any internet-connected device, as long as the smart tool is within cellular range. This also allows a smart tool to "check in" regularly, for instance daily with the cloud server when a particular smart tool is in range of a cellular tower. During these "check-ins", the tool can upload use data for reports or to display status information relating to each tool of interest, or the tool can initiate that the cloud server sends maintenance reminders to the registered tool user or owner, as described herein. Additionally, the tool can send its GPS location to the cloud server.

Alternatively, a particular smart tool can receive certain data directly from the cloud server without the need to store this data on the smartphone or other mobile device, which would otherwise require a user to wait, to connect to a smart tool. Data transferred, can include warnings, for example to be displayed on a smart tool display, and/or firmware updates, and/or new use parameters, such as for example use limits.

A designated smart tool could be unlocked remotely. The user, who may not be the owner, does not need to have an authorized smartphone in the vicinity of a smart tool in order for the smart tool to be unlocked and usable. Instead, the authorized person, for example the owner or supervisor, can unlock a smart tool remotely from any device having an internet connection. Similarly, the smart tool can be locked remotely.

While maintaining effectiveness of the theft deterrent aspect of the present subject matter, and still able to collect use data from any particular smart tool, the risk of work interruptions and loss of productivity because of a locked tool is greatly reduced.

The selected smart tool can be remotely located from any conventional internet-connected device, by sending an appropriate electronic signal to a conventional cloud server from at least one mobile device or computer, for causing the cloud server to send a signal to the smart tool via a cellular connection. When a smart tool is within reach of a cellular connection, the tool can relay its GPS coordinates. If a smart tool is not within a cellular connection range when the signal is sent from the cloud server, the cloud server can periodically resend the signal to the tool until the tool can be reached.

The advantages of these aspects of the present subject matter regarding electronic tool lock features are that certain use parameters can be "set up" in advance, and that the tool stops working after expiration of this use parameter without any need of additional intervention. However, the addition of cellular connectivity also enables the selected smart tool to be locked remotely by sending a command to the tool via cellular connection, for example in case a tool is deemed "missing." This only works if a tool at this time is connected to the internet and can receive the "lock" command. If the tool is not connected to the internet, the lock command can be periodically resent by the cloud server until the tool is successfully locked. By adding cellular communication provisions to the tool, connection, the options to communicate with the tool are greatly improved.

The present subject matter thus enables an authorized user or the owner to lock the smart tool when not in use and/or authorize the smart tool to perform only a certain task such as a fixed number of operations to ensure a tool is not being misused or to account for operations performed for a job. The present subject matter will enable a wide variety of power tools to be configurable and potentially be protected from theft. Typically, power tools are manufactured with brushed and/or brushless motors. The power tool electronics hardware is configured with conventional wireless modules like Bluetooth, LTE, narrowband-IoT, Wi-Fi, NFC, etc. In operation, wireless modules communicate with at least one conventional microcontroller and conventional external/internal memory to store smart tool information. Further in accordance with the present subject matter, the microcontroller drives conventional gate drivers to enable conventional Metal Oxide Semiconductor Field Effect Transistors (MOSFETs) (or other conventional switching transistors or like components) which in turn actuate the motor. Such conventional circuitry includes or contains current and voltage monitoring circuits and is interfaced with the microcontroller. Such a conventional microcontroller is able to collect raw data and store it in at least one external/internal memory device for further data processing. Moreover, in the smart tool system of the present subject matter, at least one smart tool can include at least one mechanical or hydraulic component dimensioned and configured for motor-driven operation. The system disclosed herein further comprises at least one brushed or brushless motor operatively configured for driving the at least one mechanical or hydraulic component; and the data-storage provisions of the associated smart tool stores instructions for disabling such motor automatically after predetermined operational conditions for such motor have occurred.

Figure 10:
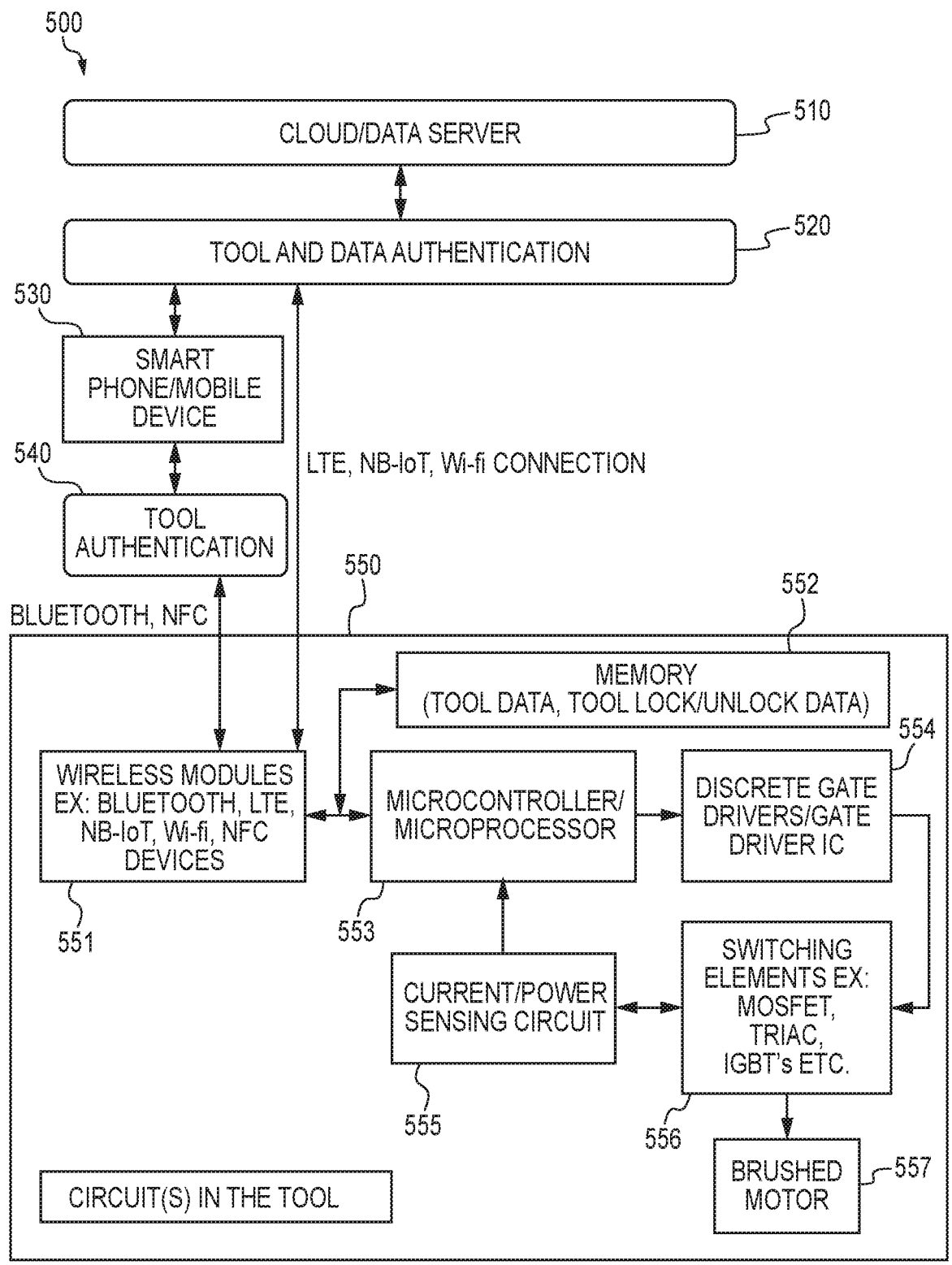
FIGS. 10 and 11 are schematic block diagrams illustrating hardware configuration embodiments for brushed motors and brushless motors, respectively.
Figure 11:
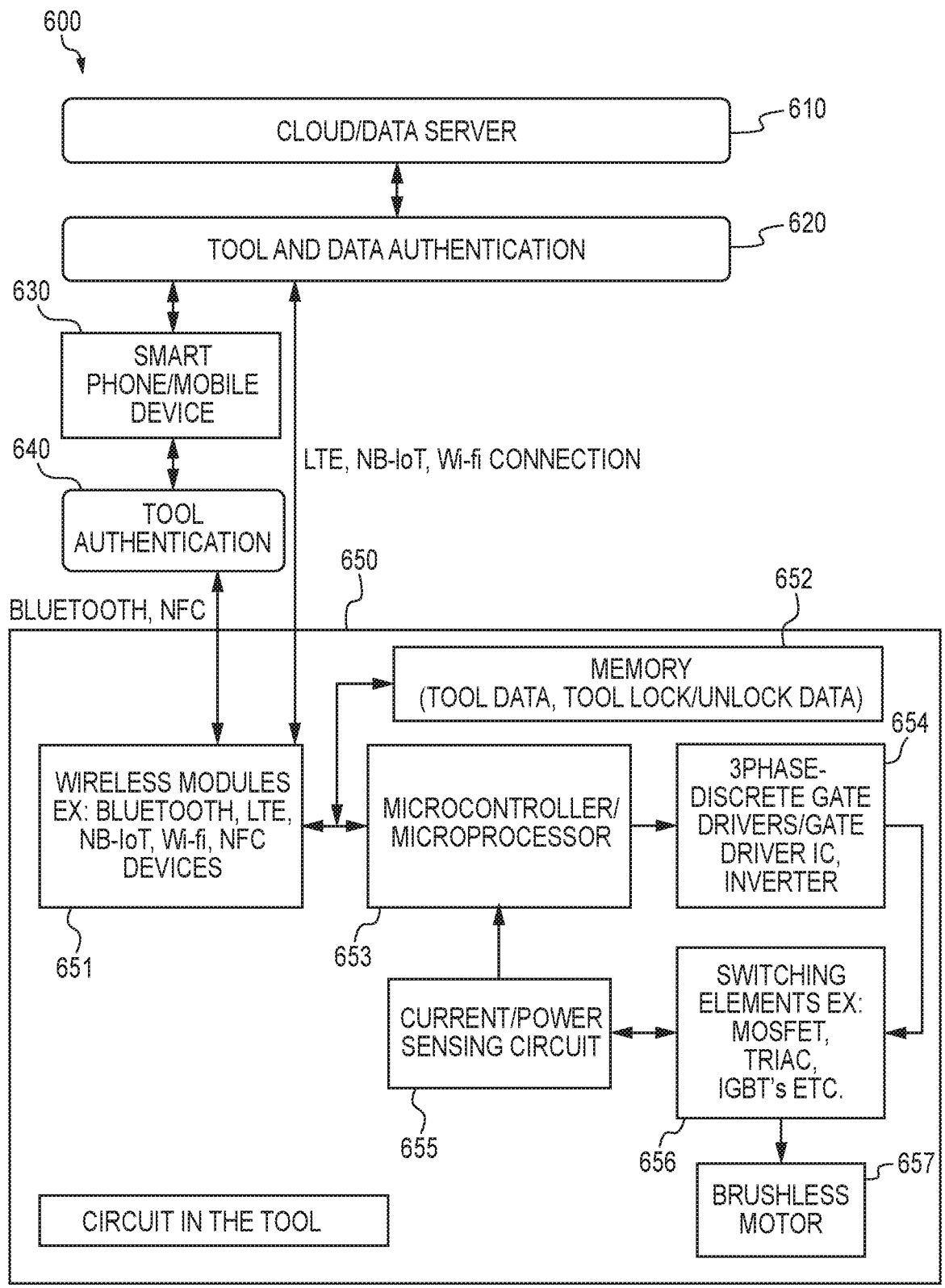

Data processing can be performed by the microcontroller and the raw data can be sent to the cloud through wireless communication as shown in the block diagrams of FIGS. 10 and 11 for data processing to identify tool operation.

Specifically, FIG. 10 schematically illustrates a system 500 for tool locking provisions in a tool utilizing a brushed electric motor. The system 500 comprises a cloud-based registration-and-control component 510, a mobile device such as a smartphone, generally denoted as 530, and a tool 550 including communication provisions such as radio communication provisions, Bluetooth, NFC, and/or cellular communication provisions. The system 500 also comprises provisions 520 for tool and data authentication. These provisions are typically provided in, or otherwise associated with, the cloud-based registration-and-control component 510. The system 500 also comprises provisions 540 for tool authentication. These provisions are typically provided in, or otherwise associated with, the mobile device or smartphone 530. The tool 550 includes one or more wireless communication module(s) such as Bluetooth, cellular communications or LTE, and other wireless protocols such as NB-IoT, Wi-Fi, NFC, etc. These module(s) are collectively denoted as 551. The tool 550 also includes memory 552. This memory can include dedicated memory for storage of tool data, lock or unlock data, and the like. The tool 550 also includes one or more microcontroller(s) and/or microprocessor(s) generally denoted as 553. The tool 550 also includes one or more gate drivers and/or gate driver circuits, generally referred to as 554. The tool 550 also includes current or power sensing circuit(s) generally denoted as 555. The tool 550 also includes switching elements for example conventional MOSFETs, Triodes for alternating current (Triacs), Insulated Gate Bipolar Transistors (IGBTs), and the like. These switching elements are collectively referred to as 556. The tool 550 also includes a brushed motor 557 for driving one or more tool components. As shown in FIG. 10, the cloud-based registration-and-control component 510 is in communication with the provisions 520 for smart tool and data authentication. Also, the provisions 520 are in communication with the mobile device 530 and the wireless module(s) 551 of the smart tool 550. Moreover, mobile device or smartphone 530 is in communication with smart tool authentication provisions 540, which in turn are in communication with the wireless modules 551 of the tool 550. The wireless modules 551 are also in communication with the tool memory 552 and the tool microcontroller(s) 553. The microcontroller(s) 553 is in communication with the gate drivers 554. The gate drivers 554 are in communication with the switching elements 556, which in turn are in communication with the current or power sensing circuits 555 which in turn are in communication with microcontroller(s) 553. Switching elements 556 are also in communication with the brushed motor 557.

Specifically, FIG. 11 schematically illustrates a system 600 for tool locking provisions in a smart tool utilizing a brushless electric motor. The system 600 includes a cloud-based registration-and-control component 610, a conventional mobile device such as a smartphone, generally denoted as 630, and a smart tool 650 including conventional communication provisions such as, e.g., radio communication provisions, Bluetooth, NFC, and/or cellular communication provisions. The system 600 includes provisions 620 for smart tool and data authentication. These provisions are typically provided in, or otherwise associated with, the cloud-based registration-and-control component 610. The system 600 also comprises provisions 640 for tool authentication. These provisions are typically provided in, or otherwise associated with, a conventional mobile device such as a smartphone 630. The smart tool 650 can include one or more conventional wireless communication module(s) including, but not limited to, Bluetooth, cellular communications or LTE, as well as other wireless protocols including, but not limited to NB-IoT, Wi-Fi, NFC, etc. These module(s) are collectively denoted as 651. The tool 650 also includes memory 652. This memory can include dedicated memory for storage of tool data, lock or unlock data, and the like. The smart tool 650 includes one or more conventional microcontroller(s) and/or microprocessor(s) generally denoted as 653. Such smart tool 650 also includes one or more conventional gate drivers and/or gate driver circuits (particularly 3-phase discrete gate drivers), generally referred to as 654. Such smart tool 650 also includes conventional current or power sensing circuit(s) generally denoted as 655. Such smart tool 650 further includes conventional switching elements for example MOSFETs, Triacs, IGBTs, and the like. Such switching elements are collectively referred to as 656. The tool 650 also includes a conventional brushless motor 657 for driving one or more smart tool components. As shown in FIG. 11, the conventional cloud-based registration-and-control component 610 is in communication with the provisions 620 for smart tool and data authentication. And the provisions 620 are in communication with the mobile device 630 and the wireless module(s) 651 of the tool 650. The mobile device or smartphone 630 is in electronic communication with the smart tool authentication provisions 640, which in turn are in electronic communication with the wireless module(s) 651 of the smart tool 650. The wireless module(s) 651 are also in communication with the smart tool memory 652 and the tool microcontroller(s) 653. The microcontroller(s) 653 is in communication with the conventional gate drivers 654. The gate drivers 654 are in communication with conventional switching elements 656, which in turn are in communication with the current or power sensing circuits 655. Power-sensing circuits 655, in turn are in communication with microcontroller(s) 653. The switching elements 656 are also in communication with the brushless motor 657.

Tool Lock Enable/Disable Feature

An authorized user or smart tool owner can connect to the tool wirelessly and enable the tool for a fixed number of operations from a remote or mobile device such as a cell phone or from the cloud before starting a job. Typically, the number of operations will be stored in internal or external memory of a particular smart tool. When a smart tool reaches the number of operations set by the user, the tool will be disabled and locked by the microprocessor for further operations. The tool defaults to NO LIMIT until an authorized user sets a number of operations through a smartphone or the cloud.

A smart tool can be unlocked remotely. A user, not the owner, does not have to have an authorized smartphone in the vicinity of the smart tool in order for the tool to be unlocked and usable. Instead, the authorized person, for example the owner or supervisor, can unlock the tool remotely from any device with an internet connection.

Figure 12:
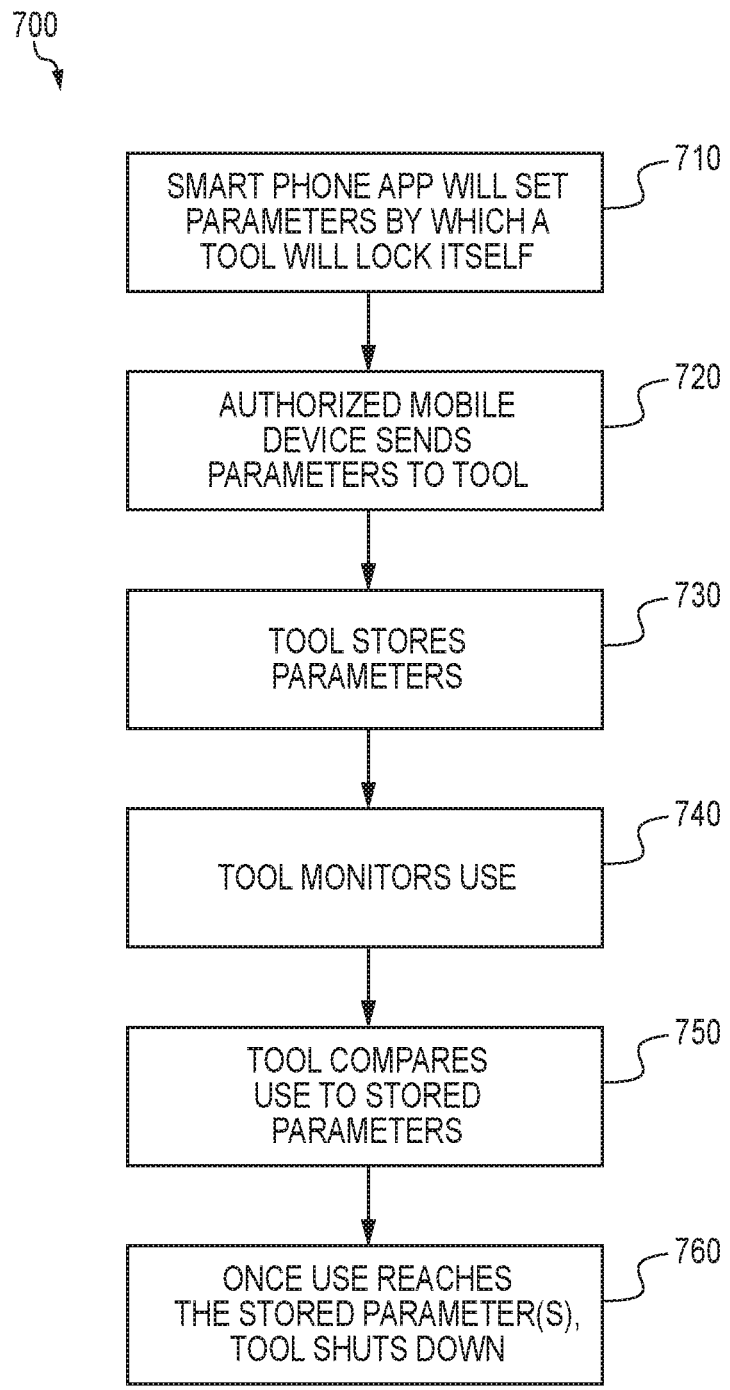
FIG. 12 is a schematic flow chart illustrating a method for governing tool use and particularly locking a tool in accordance with an embodiment of the present subject matter.

FIG. 12 illustrates a method 700 for governing smart tool use such as locking a tool wirelessly utilizing radio communication such as Bluetooth communication and particular Bluetooth Low Energy (BLE), in accordance with an embodiment of the present subject matter. Although described using BLE, it will be understood that the present subject matter is not limited to such and includes other wireless communication protocols. According, in method 700, an authorized user or owner initiates a smart tool lock command from a conventional remote device which can, e.g., be a smartphone. Typically, the user sets parameters via the smartphone, or via a conventional software application (conventionally referred to a smartphone App), by which the smart tool will lock itself. The smartphone or smartphone App can set parameters that limit use of the tool, for example, to: (i) 1 or more cycle of use, (ii) 10 or more cycles of use, (iii) 100 or more cycles of use, (iv) 500 or more cycles of use, (v) 1,000 or more cycles of use, (vi) 5,000 or more cycles of use, etc. Generally, an authorized user or owner "signs up" for an account in order to access the smart tool. Sign up can be achieved using the cloud. Upon "sign up" (also called registration), the user could be authorized to access one or more smart tools. Typically, this includes authorizing the user's mobile device(s) such as the user's one or more designated smartphones to communicate with specific smart tool(s). Once authorized, the user's mobile device or smartphone can communicate with specific tool(s). At such time, the user's mobile device or smartphone can connect to the smart tool directly such as through BTE, and set parameters, or the user's mobile device or smartphone can connect to the cloud, and the cloud thereafter communicates to the smart tool(s) to set parameters. This is shown as operation 710. In the ensuing operation(s) 720, the authorized mobile device sends select parameter(s) to the tool(s). In operation(s) 730, the smart tool(s) store the parameter(s). In operation(s) 740, upon use or operation of each such smart tool, the tool monitors its use/operation. Typically, this is performed by the tool counting actuations, monitoring time of use, or some other factor(s) as described herein. In operation(s) 750, the selected smart tool compares its use to stored parameter(s). When the use reaches or exceeds the stored parameter(s), the smart tool shuts down or otherwise discontinues use or operation. This is shown as operation(s) 760. Typically, in operation(s) 760, lock status stored in smart tool memory is read, and microcontroller(s) in the tool then activate tool electronic locking provisions. Typically, this is performed by a smart tool disabling tool drive components such as gate drivers and MOSFETs. Upon locking or disabling of the tool drive or drive components, a tool sends or confirms its status back to a remote device and/or cloud. Preferably, the tool shuts down by itself, without being connected to, or being in communication with, anything else including mobile device(s), smartphone(s), and/or the cloud.

Figure 13:
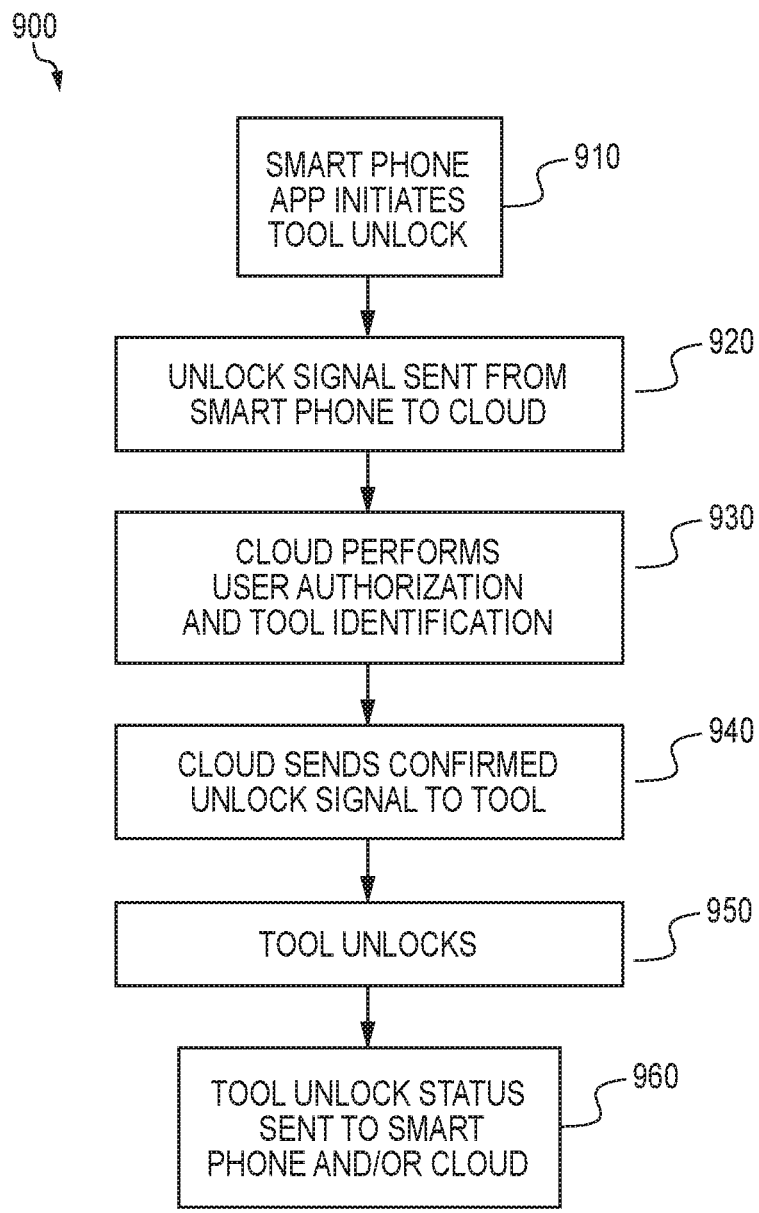
FIG. 13 is a schematic flow chart illustrating a method for governing tool use and particularly unlocking a tool in accordance with an embodiment of the present subject matter.

FIG. 13 illustrates yet another method 900 for governing smart tool use such as unlocking a tool from a remote device such as a smartphone having capability to connect to the cloud. This connection can be via the internet, or can be performed using a convention cellular network, or can be achieved by both. Although the method 900 is described utilizing a smartphone, it will be understood that any device having such connection capability could be utilized. In the method 900, a user initiates a tool unlock command from the noted device. This operation is shown as operation(s) 910. In the ensuing operation(s) 920, an unlock signal is sent from the noted device to the cloud, for example to a conventional cloud-based registration-and-control component as described herein. In operation(s) 930, the cloud authenticates or validates the user, and/or identifies the smart tool to be unlocked. These operation(s) are denoted as 930. After confirming such operations, the cloud then sends a confirmed unlock signal to the smart tool, as shown by operation(s) 940. Upon receipt of that confirmed unlock signal by the tool, the tool locking provisions are actuated or de-activated to thereby unlock the tool. These operation(s) are shown as operation(s) 950. Optionally, the tool may then transmit its unlock status to the cloud and/or the device, shown as operation(s) 960.

After a smart tool locks or disables itself after its number of cycles have run, an authorized user may want to re-activate a locked or disabled smart tool for several reasons. One example is where an authorized user or smart tool owner would like to re-activate a particular smart tool for 1, 5, 10, or more "use" cycles, in order to perhaps trigger a GPS feature, located on the smart tool or elsewhere, to discover the location of the tool. For such a purpose, parameters originally "set up" on a smart tool are not necessarily limited only to a certain number of operational cycles. Accordingly, additional operational parameter may relate to time-of-day restrictions. For example, the smart tool may only be operational between 9:00 a.m. and 5:00 p.m., or only between 10:00 am through 3:00 pm, to prevent unauthorized individuals or parties as well as other wrongdoers from using the smart tool, without authorization, away from official job sites during off hours. Another example, perhaps used alone in combination with time-of-day restrictions in conjunction with GPS restrictions contemplates "location" restrictions such as the smart tool being operation only within 100 feet, 500 feet, 1000 feet, 1 mile, 2 miles, 5 miles, 10 miles, and so forth, of a specified location, or job site.

Figure 14:
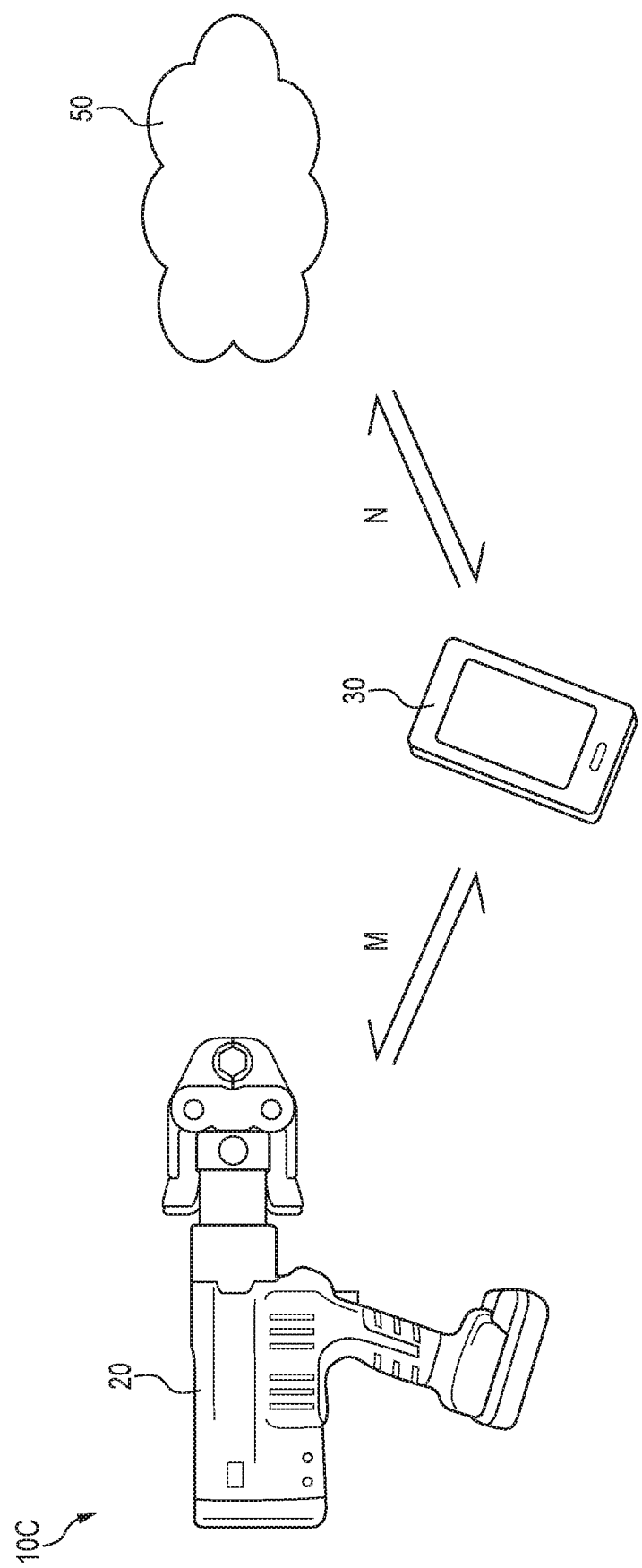
FIG. 14 is a schematic illustration of another embodiment of a system in accordance with the present subject matter.

FIG. 14 schematically illustrates yet another embodiment of a smart tool system 10C in accordance with the present subject matter. The smart tool system 10C comprises at least one smart tool (represented by handheld tool 20), at least one mobile device (represented by smartphone 30), and a conventional cloud-based infrastructure ("cloud") 50 which typically includes a conventional registration-and-control component 40' (not shown in FIG. 14), as previously described. Briefly, the smart tool system 10C illustrated by FIG. 14 comprises one or more electronic communication links able to provide two-way electronic communication between the representative smart tool 20 and the representative mobile device 30 is depicted by the electronic communication link M. A non-limiting example of link M is a wireless communication link such as BLE. For this purpose, smart tool system 10C includes at least one electronic communication link between the representative mobile device 30 and the cloud-based infrastructure 50, such communication link being depicted by link N. A currently-available, non-limiting example of link N is provided by a cellular electronic communication link such as LTE.

Figure 15:
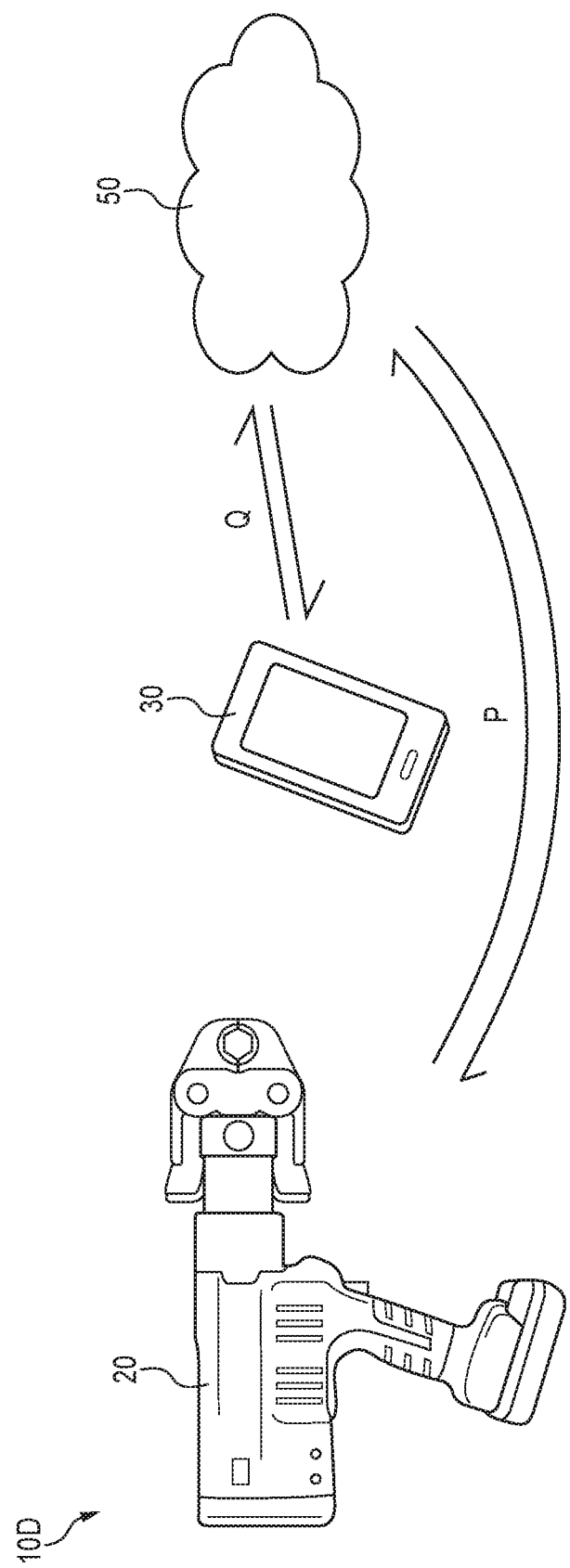
FIG. 15 is a schematic illustration of another embodiment of a system in accordance with the present subject matter.

FIG. 15 schematically illustrates still another embodiment of a smart tool system 10D in accordance with the present subject matter. The system 10D illustrated by FIG. 15 comprises at least one tool (represented by handheld tool 20), at least one mobile device (represented by smartphone 30), and cloud 50 which typically includes a registration-and-control component 40' (not shown) as previously described. The smart tool system 10D illustrated by FIG. 15 can comprise one or more conventional electronic communication links between the representative smart tool 20 and the cloud-based infrastructure 50 collectively illustrated by link P. For instance, a non-limiting example of link P is a cellular communication link such as LTE. System 10D also includes one or more conventional electronic communication links, between the representative mobile device 30 and the cloud-based infrastructure 50, as is collectively illustrated by link Q. Also, a non-limiting example of link Q is a cellular communication link such as LTE.

Figure 16:
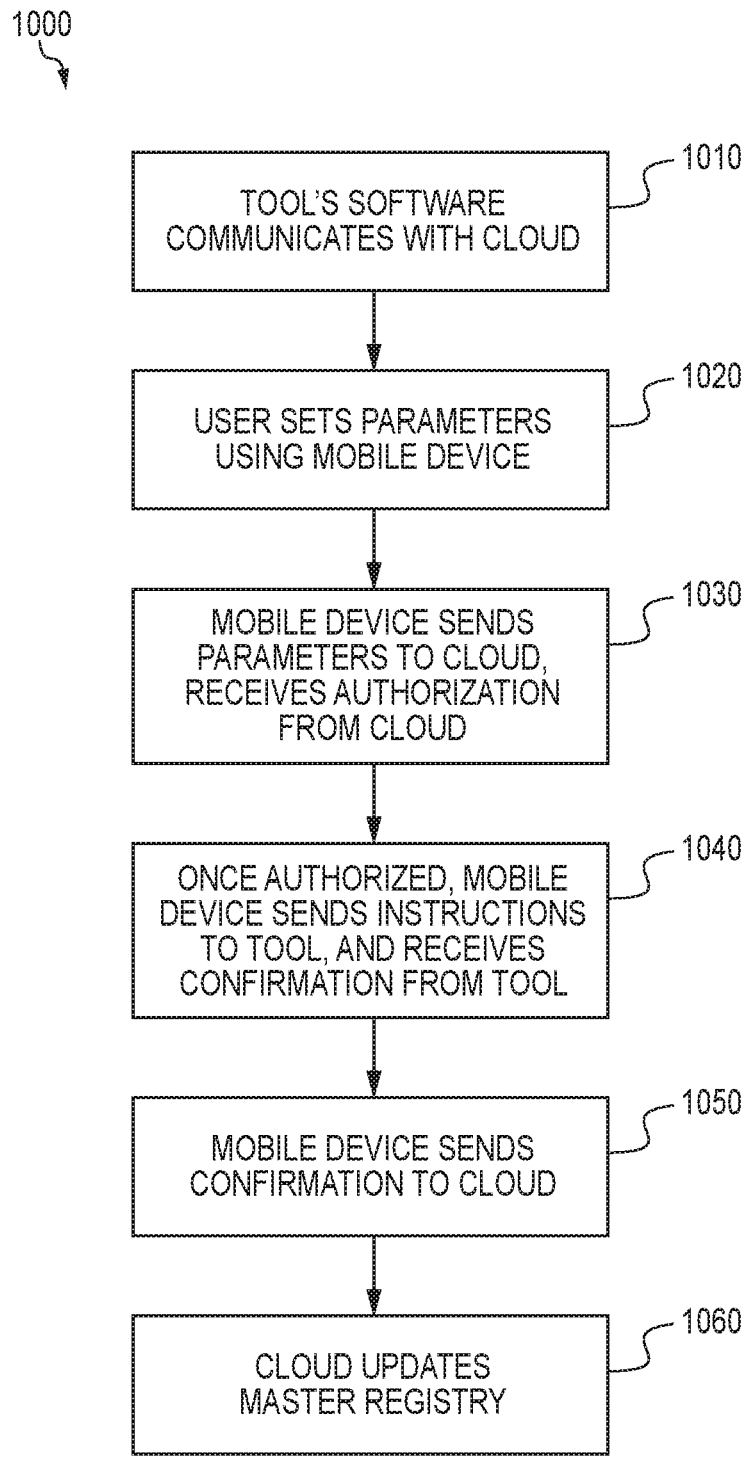
FIG. 16 is a schematic flow chart illustrating a method for governing tool use in accordance with another embodiment of the present subject matter.

FIG. 16 illustrates a method 1000 for governing operation of a tool from a remote device such as a smartphone having capability to connect to the cloud and particularly a registration-and-control component as described. The method 1000 can be performed using the system 10C shown in FIG. 14. Although the method 1000 is described using a smartphone or mobile device, it will be understood that any device having such connection capability could be used. In the method 1000, a tool's software or App communicates with the cloud to update and/or confirm that the tool's software is up to date. This can be performed periodically. These operation(s) are shown as operation(s) 1010. In operation(s) 1020, a user sets tool parameters using a mobile device such as a smartphone 30. Non-limiting examples of such parameters include one or more of (i) cycles of use, (ii) 100 or more cycles of use, (iii) 500 or more cycles of use, etc. In operation(s) 1030, the mobile device sends the selected parameters to the cloud, and upon receipt by the cloud receives authorization from the cloud. In operation(s) 1040, once authorized the mobile device sends instructions or other data to the tool, and upon receipt by the tool, the mobile device receives confirmation by the tool. Typically, the mobile device sends instructions or other data to the tool via BLE. In operation(s) 1050, the mobile device sends confirmation to the cloud. Typically, such communication is via LTE. Upon receipt of the confirmation and/or other information from the mobile device, the cloud updates a master registry, registration database, or other set of information. This is collectively shown as operation(s) 1060.

Figure 17:
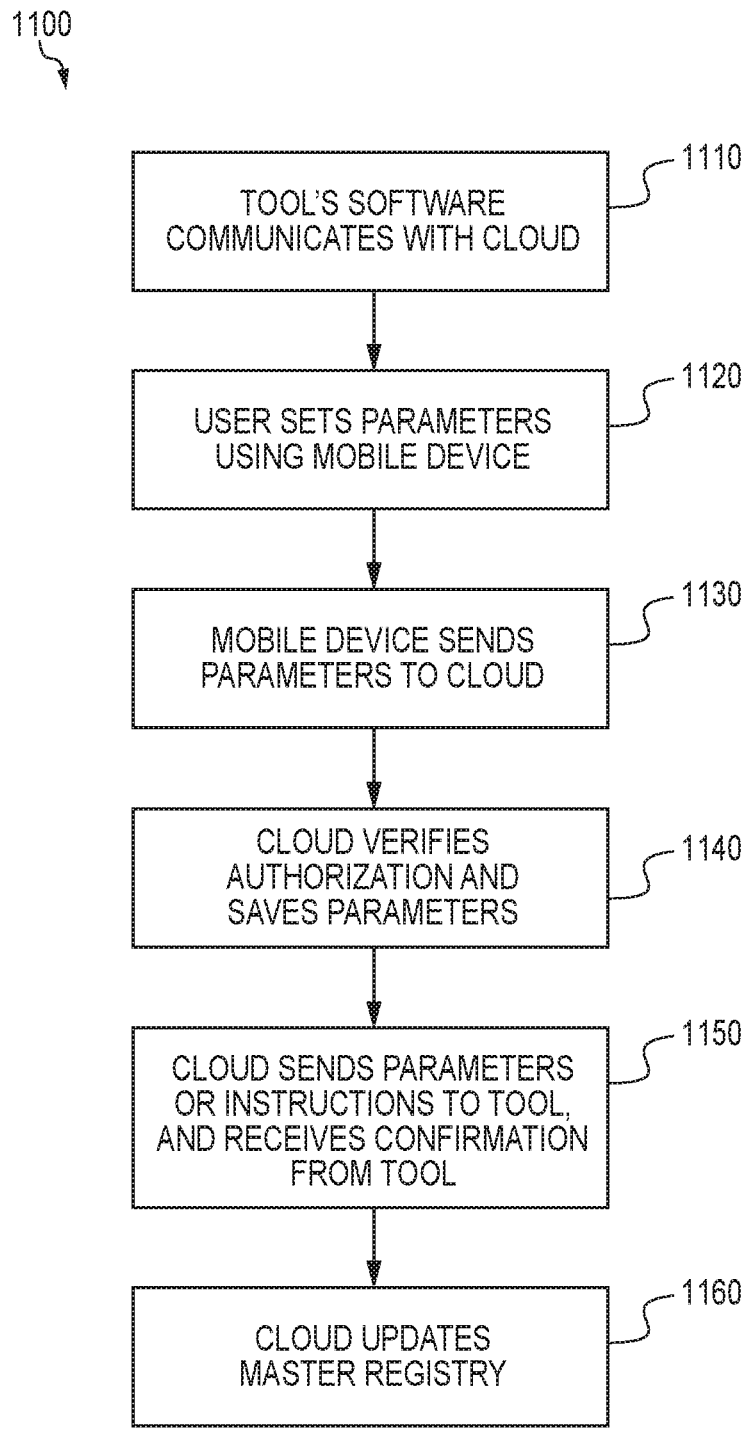
FIG. 17 is a schematic flow chart illustrating a method for governing tool use in accordance with another embodiment of the present subject matter.

FIG. 17 illustrates a method 1100 for governing operation of a tool from a remote device such as a smartphone having capability to connect to the cloud and particularly a registration-and-control component as described. The method 1100 can be performed using the system 10D shown in FIG. 15. Although the method 1100 is described using a smartphone or mobile device, it will be understood that any device having such connection capability could be used. In the method 1100, software of a smart tool communicates with the cloud to update and/or confirm that the tool's software is up to date. This can be performed periodically. Typically, the tool requests data from the cloud to confirm its software is up to date. These operation(s) are shown as operation(s) 1110. In operation(s) 1120, a user sets operational parameters on the mobile device. In operation(s) 1130, the mobile device sends parameters and/or other instructions to the cloud. In operation(s) 1140, the cloud verifies authorization, i.e., the mobile device and/or the tool, and saves the parameters and/or instructions. In operation(s) 1150, the cloud sends the parameters and/or instructions to the tool and upon receipt by the tool receives confirmation from the tool. Typically, these communications are via LTE. In operation(s) 1160, the cloud updates a master registry, registration database, or other set of information. This is collectively shown as operation(s) 1160.

The present subject matter provides numerous embodiments. In one embodiment, a smart tool system (10A) comprises a registration-and-control component (40'); at least one mobile device (30) functionally and operatively configured to communicate electronically with the registration-and-control component (40'); and at least one smart tool (20) configured to have smart-tool provisions selected from the group consisting of: electronic tool-lock provisions, wireless and/or cellular communication provisions, data-storage provisions, and combinations thereof. A first cellular communication link (G) is functionally and operatively configured for enabling data transmission between the at least one mobile device (30) and the registration-and-control component (40'). A second cellular communication link (F) is functionally and operatively configured for enabling data transmission between the registration-and-control component (40') and the at least one smart tool (20). The tool-lock provisions are functionally and operatively configured to prevent smart tool use and/or functionality based upon at least one parameter limit.

In particular embodiments, the smart tool system (10A) is configured such that the at least one parameter limit is stored in the data-storage provisions of an associated smart tool.

In another embodiment, the smart tool system (10A) is configured such that the at least one parameter limit is selected from the group of predetermined conditions consisting of: (i) number of smart tool actuations; (ii) date; (iii) period of time; (iv) number of cycles; (v) amount of time; (vi) distance from a specified location; and (vii) combinations of (i)-(vi).

In another embodiment, the smart tool system (10A) is configured such that the at least one parameter limit includes instructions for disabling the at least one smart tool (20) after at least one of the predetermined conditions occurs, resulting in a disabled smart tool.

In another embodiment, the smart tool system (10A) is configured such that at least one new parameter limit is authorized and transmitted via the first cellular communication link (G) or the second cellular communication link (F) or the first cellular communication link (G) and the second cellular communication link (F) either to a disabled smart tool, to enable the disabled smart tool to become operational subject to new parameter limits, or to enable a still-enabled smart tool to remain operational subject to new parameter limits.

In still another embodiment, the smart tool system (10A) is configured such that the new parameter limits enable indefinite use of the at least one smart tool (20).

In yet another embodiment, the smart tool system (10A) is configured such that either the first cellular communication link (G) or the second cellular communication link (F) is selected from the group consisting of 2G, 3G, LTE, and 5G.

In another embodiment, the smart tool system (10A) further includes a desktop computer (65). The registration-and-control component (40') includes communication provisions for enabling the registration-and-control component (40') to transmit and receive data including the new parameter limits via a data transmission link (L). The desktop computer (65) is configured to transmit data including the new parameter limits to the registration-and-control component (40') and receive the data from the registration-and-control component (40') via the data transmission link (L).

In another embodiment, the smart tool system (10A) is configured such that the at least one mobile device is either a smart phone, a laptop computer, a tablet computer, or a PDA.

In yet another embodiment, the smart tool system (10A) is configured such that at least one smart tool includes at least one mechanical or hydraulic component dimensioned and configured for motor-driven operation. And, the system further comprises a brushed or brushless motor operatively configured for driving the at least one mechanical or hydraulic component. The data-storage provisions store instructions for disabling the motor automatically after predetermined operational conditions for the motor have occurred.

In another embodiment, the smart tool system (10B) comprises a registration-and-control component (40'). The system also comprises at least one mobile device (30) functionally and operatively configured to communicate electronically with the registration-and-control component (40'). The system additionally comprises at least one smart tool (20) configured to have smart tool provisions selected from the group consisting of: electronic tool-lock provisions, wireless and/or cellular communication provisions, data-storage provisions, and combinations thereof. A wireless communication link (H) is functionally and operatively configured for enabling data transmission between the at least one mobile device (30) and the at least one smart tool (20). A cellular communication link (J) is functionally and operatively configured for enabling data transmission between the at least one mobile device (30) and the registration-and-control component (40'). The tool-lock provisions are functionally and operatively configured to prevent smart tool use and/or functionality based upon at least one parameter limit.

In another embodiment, the smart tool system (10B) is configured such that the at least one parameter limit is selected from the group of predetermined conditions consisting of: (i) number of smart tool actuations; (ii) date; (iii) period of time; (iv) number of cycles; (v) amount of time; (vi) distance from a specified location; and (vii) combinations of (i)-(vi).

In another embodiment, the smart tool system (10B) is configured such that the at least one parameter limit is stored in the data-storage provisions of an associated smart tool.

In another embodiment, the smart tool system (10B) is configured such that the at least one parameter limit includes instructions for disabling the at least one smart tool (20) after at least one of the predetermined conditions occurs, resulting in a disabled smart tool.

In still another embodiment, the smart tool system (10B) is configured such that a second cellular communication link (F) is functionally and operatively configured for enabling data transmission between the at least one smart tool (20) and the registration-and-control component (40'). At least one new parameter limit is authorized and transmitted either via the wireless communication link (H) or via the second cellular communication link (F) either to a disabled smart tool, to enable the disabled smart tool to become operational subject to new parameter limits, or to enable a still-enabled smart tool to remain operational subject to new parameter limits.

In yet another embodiment, the smart tool system (10B) is configured such that the new parameter limits allow indefinite use of the at least one smart tool (20).

In still another embodiment, the smart tool system (10B) is configured such that the wireless communication link (H) is selected from the group consisting of radio frequency, infrared, Bluetooth, Near Field Communication, and Wi-Fi.

In yet another embodiment, the smart tool system (10B) is configured such that a second cellular communication link (F) is functionally and operatively configured for enabling transmission of data including the new parameter limits between the at least one tool (20) and the registration-and-control component (40').

In another embodiment, the tool system (10B) of claim 35, includes a desktop computer (65). The registration-and-control component (40') includes communication provisions for enabling the registration-and-control component (40') to transmit and receive data including the new parameter limits via a communication link (L). The desktop computer (65) is configured to transmit data including the new parameter limits to the registration-and-control component (40') and receive the data from the registration-and-control component (40') via the communication link (L).

In another embodiment, the tool system (10B) is configured such that the at least one mobile device is either a smart phone, a laptop computer, a tablet computer, or a PDA.

In still another embodiment, the smart tool system (10B) is configured such that at least one smart tool includes at least one mechanical or hydraulic component dimensioned and configured for motor-driven operation. The system further comprises a brushed or brushless motor operatively configured for driving the at least one mechanical or hydraulic component. The data-storage provisions store instructions for disabling the motor automatically after predetermined operational conditions for the motor have occurred.

In yet another embodiment, a method for setting up and operating a smart-tool system (10A) comprises providing a smart-tool system (10A). The system comprises at least one smart tool (20) operatively configured to have smart-tool provisions selected from the group consisting of: tool-lock provisions, wireless and/or cellular data transmission and/or electronic communication provisions, data-storage provisions, and combinations thereof. The system also comprises at least one mobile device (30) functionally and operatively configured to communicate with a registration-and-control component (40'). The tool-lock provisions are functionally and operatively configured to prevent smart-tool functionality based upon at least one parameter limit. The method comprises providing data transfer and cellular communication information effective for enabling a user to establish a first cellular communication link (G) effective for sending and/or receiving data including the at least one parameter limit between the at least one mobile device (30) and the registration-and-control component (40'). The method also comprises providing data transfer and cellular communication information effective for enabling a user to establish a second cellular communication link (F) effective for sending and/or receiving data including the at least one parameter limit between the at least one smart tool (20) and the registration-and-control component (40').

In another embodiment, the method includes storing the at least one parameter limit in the data-storage provisions of an associated smart tool, wherein the at least one parameter limit includes instructions for disabling the associated smart tool after at least one of the predetermined conditions occurs, thereby resulting in a disabled smart tool.

In another embodiment, the method further includes sending information regarding at least one new authorized parameter limit via either the first cellular communication link (G) or the second cellular communication link (F) to the disabled smart tool, for thereby enabling the disabled smart tool to become operational subject to new parameter limits.

In still another embodiment, the method further includes providing a desktop computer (65), and providing instructions effective for enabling a user to establish a data transfer link (K) for sending and/or receiving data including the new parameter limits between the desktop computer (65) and the registration-and-control component (40'). The method also includes transmitting the data including the new parameter limits on the data transfer link (K) between the computer (65) and the registration-and-control component (40').

In yet another embodiment, a method for setting up and operating a smart-tool system (10B) comprises providing a smart-tool system (10B). The system comprises at least one smart tool (20) operatively configured to have smart-tool provisions selected from the group consisting of: tool-lock provisions, wireless and/or cellular data transmission and/or electronic communication provisions, data-storage provisions, and combinations thereof. The system also comprises at least one mobile device (30) functionally and operatively configured to communicate with a registration-and-control component (40'). The tool-lock provisions are functionally and operatively configured to prevent smart-tool functionality based upon at least one parameter limit. The method also comprises providing data transfer and wireless communication information effective for enabling a user to establish a wireless communication link (H) effective for sending and/or receiving data including the at least one parameter limit between the at least one smart tool (20) and the at least one smart tool (20). The method additionally comprises providing data transfer and cellular communication information effective for enabling a user to establish a cellular communication link (J) effective for sending and/or receiving data including the at least one parameter limit between the at least one mobile device (30) and the registration-and-control component (40').

In another embodiment, the method includes storing the at least one parameter limit in the data-storage provisions of an associated smart tool, wherein the at least one parameter limit includes instructions for disabling the associated smart tool after at least one of the predetermined conditions occurs, thereby resulting in a disabled smart tool.

In another embodiment, the method further includes sending information regarding at least one new authorized parameter limit via either the wireless communication link (H) or the cellular communication link (J) to the disabled smart tool, for thereby enabling the disabled smart tool to become operational subject to new parameter limits.

In yet another embodiment, the method further comprises providing a desktop computer (65), and providing instructions effective for enabling a user to establish a data transfer link (L) for sending and/or receiving data including the new parameter limits between the desktop computer (65) and the registration-and-control component (40'). The method also includes transmitting the data including the new parameter limits on the data transfer link (L) between the computer (65) and the registration-and-control component (40').

Although the methods described herein are described using wireless communication in the form of Bluetooth and cellular, respectively, it will be understood that the present subject matter includes the use of nearly any wireless communication protocol or technology. Furthermore, it will be appreciated that the present subject matter includes a wide array of memory and storage techniques and hardware.

Moreover, the present subject matter is not limited to the motor technologies disclosed herein.

Many other benefits will no doubt become apparent from future application and development of this technology.

All patents, published applications, standards and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A smart tool system (10A) comprising:
a registration-and-control component (40');
at least one mobile device (30) functionally and operatively configured to communicate electronically with the registration-and-control component (40');
and
at least one smart tool (20) configured to have smart-tool provisions selected from the group consisting of: electronic tool-lock provisions, wireless and/or cellular communication provisions, data-storage provisions, and combinations thereof; wherein a first cellular communication link (G) is functionally and operatively configured for enabling data transmission between the at least one mobile device (30) and the registration-and-control component (40'); wherein a second cellular communication link (F) is functionally and operatively configured for enabling data transmission between the registration-and-control component (40') and the at least one smart tool (20); and wherein the tool-lock provisions are functionally and operatively configured to render a smart tool operative or inoperative and are based upon at least one parameter limit, wherein the at least one parameter limit is selected from the group consisting of: (i) a preselected number of actuations or cycles rendering a tool inoperative; (ii) a preselected date rendering a tool inoperative; (iii) a preselected period of time when a tool is rendered operative; (iv) a preselected amount of use time rendering a tool inoperative; and (v) combinations of (i)-(iv).

2. The smart tool system (10A) of claim 1, wherein the at least one parameter limit is stored in the data-storage provisions of an associated smart tool.

3. The smart tool system (10A) of claim 1, wherein at least one new parameter limit is authorized and transmitted via the first cellular communication link (G) or the second cellular communication link (F) or the first cellular communication link (G) and the second cellular communication link (F) either to a disabled smart tool, to enable the disabled smart tool to become operational subject to new parameter limits, or to enable a still-enabled smart tool to remain operational subject to new parameter limits.

4. The smart tool system (10A) of claim 3, wherein the new parameter limits enable indefinite use of the at least one smart tool (20).

5. The smart tool system (10A) of claim 1, wherein either the first cellular communication link (G) or the second cellular communication link (F) is selected from the group consisting of 2G, 3G, LTE, and 5G.

6. The smart tool system (10A) of claim 4, further including
a desktop computer (65), wherein the registration-and-control component (40') includes communication provisions for enabling the registration-and-control component (40') to transmit and receive data including the new parameter limits via a data transmission link (L); and wherein the desktop computer (65) is configured to transmit data including the new parameter limits to the registration-and-control component (40') and receive the data from the registration-and-control component (40') via the data transmission link (L).

7. The smart tool system (10A) of claim 1, wherein the at least one mobile device is either a smart phone, a laptop computer, a tablet computer, or a PDA.

8. The smart tool system (10A) of claim 1, wherein at least one smart tool includes at least one mechanical or hydraulic component dimensioned and configured for motor-driven operation, further comprising:
a brushed or brushless motor operatively configured for driving the at least one mechanical or hydraulic component; wherein the data-storage provisions store instructions for disabling the motor automatically after predetermined operational conditions for the motor have occurred.

9. A smart tool system (10B) comprising:
a registration-and-control component (40');
at least one mobile device (30) functionally and operatively configured to communicate electronically with the registration-and-control component (40'); and
at least one smart tool (20) configured to have smart tool provisions selected from the group consisting of: electronic tool-lock provisions, wireless and/or cellular communication provisions, data-storage provisions, and combinations thereof; wherein a wireless communication link (H) is functionally and operatively configured for enabling data transmission between the at least one mobile device (30) and the at least one smart tool (20); wherein a cellular communication link (J) is functionally and operatively configured for enabling data transmission between the at least one mobile device (30) and the registration-and-control component (40'); and wherein the tool-lock provisions are functionally and operatively configured to render a smart tool operative or inoperative and are based upon at least one parameter limit, wherein the at least one parameter limit is selected from the group consisting of: (i) a preselected number of actuations or cycles rendering a tool inoperative; (ii) a preselected date rendering a tool inoperative; (iii) a preselected period of time when a tool is rendered operative; (iv) a preselected amount of use time rendering a tool inoperative; and (v) combinations of (i)-(iv).

10. The smart tool system (10B) of claim 9, wherein the at least one parameter limit is stored in the data-storage provisions of an associated smart tool.

11. The smart tool system (10B) of claim 9, wherein a second cellular communication link (F) is functionally and operatively configured for enabling data transmission between the at least one smart tool (20) and the registration-and-control component (40'); and wherein at least one new parameter limit is authorized and transmitted either via the wireless communication link (H) or via the second cellular communication link (F) either to a disabled smart tool, to enable the disabled smart tool to become operational subject to new parameter limits, or to enable a still-enabled smart tool to remain operational subject to new parameter limits.

12. The smart tool system (10B) of claim 11, wherein the new parameter limits allow indefinite use of the at least one smart tool (20).

13. The smart tool system (10B) of claim 9, wherein the wireless communication link (H) is selected from the group consisting of radio frequency, infrared, Bluetooth, Near Field Communication, and Wi-Fi.

14. The smart tool system (10B) of claim 13, wherein a second cellular communication link (F) is functionally and operatively configured for enabling transmission of data including the new parameter limits between the at least one tool (20) and the registration-and-control component (40').

15. The tool system (10B) of claim 14, including a desktop computer (65), wherein the registration-and-control component (40') includes communication provisions for enabling the registration-and-control component (40') to transmit and receive data including the new parameter limits via a communication link (L); and wherein the desktop computer (65) is configured to transmit data including the new parameter limits to the registration-and-control component (40') and receive the data from the registration-and-control component (40') via the communication link (L).

16. The tool system (10B) of claim 9, wherein the at least one mobile device is either a smart phone, a laptop computer, a tablet computer, or a PDA.

17. The smart tool system (10B) of claim 9, wherein at least one smart tool includes at least one mechanical or hydraulic component dimensioned and configured for motor-driven operation, further comprising: a brushed or brushless motor operatively configured for driving the at least one mechanical or hydraulic component; wherein the data-storage provisions store instructions for disabling the motor automatically after predetermined operational conditions for the motor have occurred.

18. A method for setting up and operating a smart-tool system (10A), the method comprising:
providing a smart-tool system (10A) comprising: at least one smart tool (20) operatively configured to have smart-tool provisions selected from the group consisting of: tool-lock provisions, wireless and/or cellular data transmission and/or electronic communication provisions, data-storage provisions, and combinations thereof; and at least one mobile device (30) functionally and operatively configured to communicate with a registration-and-control component (40'); wherein the tool-lock provisions are functionally and operatively configured to render a smart-tool operative or inoperative based upon at least one parameter limit, wherein the at least one parameter limit is selected from the group consisting of: (i) a preselected number of actuations or cycles rendering a tool inoperative; (ii) a preselected date rendering a tool inoperative; (iii) a preselected period of time when a tool is rendered operative; (iv) a preselected amount of use time rendering a tool inoperative; and (v) combinations of (i)-(iv);
providing data transfer and cellular communication information effective for enabling a user to establish a first cellular communication link (G) effective for sending and/or receiving data including the at least one parameter limit between the at least one mobile device (30) and the registration-and-control component (40'); and providing data transfer and cellular communication information effective for enabling a user to establish a second cellular communication link (F) effective for sending and/or receiving data including the at least one parameter limit between the at least one smart tool (20) and the registration-and-control component (40').

19. The method of claim 18, including storing the at least one parameter limit in the data-storage provisions of an associated smart tool, wherein the at least one parameter limit includes instructions for disabling the associated smart tool after at least one of the predetermined conditions occurs, thereby resulting in a disabled smart tool.

20. The method of claim 19, further including sending information regarding at least one new authorized parameter limit via either the first cellular communication link (G) or the second cellular communication link (F) to the disabled smart tool, for thereby enabling the disabled smart tool to become operational subject to new parameter limits.

21. The method of claim 18 further including:

providing a desktop computer (65), and providing instructions effective for enabling a user to establish a data transfer link (K) for sending and/or receiving data including the new parameter limits between the desktop computer (65) and the registration-and-control component (40'); and transmitting the data including the new parameter limits on the data transfer link (K) between the computer (65) and the registration-and-control component (40').

22. A method for setting up and operating a smart-tool system (10B), the method comprising:

providing a smart-tool system (10B) comprising: at least one smart tool (20) operatively configured to have smart-tool provisions selected from the group consisting of: tool-lock provisions, wireless and/or cellular data transmission and/or electronic communication provisions, data-storage provisions, and combinations thereof; and at least one mobile device (30) functionally and operatively configured to communicate with a registration-and-control component (40'); wherein the tool-lock provisions are functionally and operatively configured to render a smart-tool operative or inoperative based upon at least one parameter limit, wherein the at least one parameter limit is selected from the group consisting of: (i) a preselected number of actuations or cycles rendering a tool inoperative; (ii) a preselected date rendering a tool inoperative; (iii) a preselected period of time when a tool is rendered operative; (iv) a preselected amount of use time rendering a tool inoperative; and (v) combinations of (i)-(iv);

providing data transfer and wireless communication information effective for enabling a user to establish a wireless communication link (H) effective for sending and/or receiving data including the at least one parameter limit between the at least one smart tool (20) and the at least one smart tool (20); and providing data transfer and cellular communication information effective for enabling a user to establish a cellular communication link (J) effective for sending and/or receiving data including the at least one parameter limit between the at least one mobile device (30) and the registration-and-control component (40').

23. The method of claim 22, including storing the at least one parameter limit in the data-storage provisions of an associated smart tool, wherein the at least one parameter limit includes instructions for disabling the associated smart tool after at least one of the predetermined conditions occurs, thereby resulting in a disabled smart tool.

24. The method of claim 23, further including sending information regarding at least one new authorized parameter limit via either the wireless communication link (H) or the cellular communication link (J) to the disabled smart tool, for thereby enabling the disabled smart tool to become operational subject to new parameter limits.

25. The method of claim 22 further including:

providing a desktop computer (65), and providing instructions effective for enabling a user to establish a data transfer link (L) for sending and/or receiving data including the new parameter limits between the desktop computer (65) and the registration-and-control component (40'); and transmitting the data including the new parameter limits on the data transfer link (L) between the computer (65) and the registration-and-control component (40').

\* \* \* \* \*